United States Patent
Braedt et al.

(10) Patent No.: US 9,533,735 B2
(45) Date of Patent: Jan. 3, 2017

(54) MULTIPLE-SPROCKET ARRANGEMENT FOR A BICYCLE GEARING

(71) Applicant: SRAM Deutschland GmbH, Schweinfurt (DE)

(72) Inventors: Henrik Braedt, Hambach (DE); Matthias Reinbold, Schweinfurt (DE)

(73) Assignee: SRAM Deutschland GmbH, Schweinfurt (DE)

( * ) Notice: Subject to any disclaimer, the term of this patent is extended or adjusted under 35 U.S.C. 154(b) by 52 days.

(21) Appl. No.: 14/334,120

(22) Filed: Jul. 17, 2014

(65) Prior Publication Data

US 2015/0024884 A1    Jan. 22, 2015

(30) Foreign Application Priority Data

Jul. 19, 2013  (DE) .......................... 10 2013 012 066

(51) Int. Cl.
| | |
|---|---|
| *F16H 55/12* | (2006.01) |
| *F16H 55/30* | (2006.01) |
| *B62M 9/10* | (2006.01) |
| *F16H 9/24* | (2006.01) |

(52) U.S. Cl.
CPC .................. *B62M 9/10* (2013.01); *F16H 9/24* (2013.01); *F16H 55/30* (2013.01)

(58) Field of Classification Search
CPC ............ B62M 9/10; B62M 9/12; F16D 41/30; F16H 55/30; B60B 27/026
USPC ....................................................... 474/160
See application file for complete search history.

(56) References Cited

U.S. PATENT DOCUMENTS

| | | | | |
|---|---|---|---|---|
| 4,324,323 | A * | 4/1982 | Campagnolo ........... | F16D 41/30 192/64 |
| 4,472,163 | A * | 9/1984 | Bottini ..................... | B62M 9/10 192/64 |
| 4,869,710 | A * | 9/1989 | Iwasaki ................... | F16D 41/30 474/160 |
| 5,503,600 | A * | 4/1996 | Berecz .................... | F16H 55/30 474/160 |
| 5,704,859 | A * | 1/1998 | Feng ....................... | F16D 41/30 474/160 |
| 6,382,381 | B1 * | 5/2002 | Okajima ............... | B60B 1/0215 192/64 |

(Continued)

FOREIGN PATENT DOCUMENTS

| | | |
|---|---|---|
| DE | 9408910 U1 | 7/1994 |
| DE | 20116764 U1 | 12/2001 |

(Continued)

*Primary Examiner* — Henry Liu
(74) *Attorney, Agent, or Firm* — Milan Milosevic; Lisa Serdynski

(57) ABSTRACT

A multiple-sprocket arrangement for mounting on a rear wheel axle of a bicycle includes a receiving body designed for mounting on the rear wheel axle, and a sprocket assembly. The sprocket assembly includes a first sprocket, the inner diameter of which is greater than an outer diameter of the receiving body and which is connected to the receiving body. The sprocket assembly further includes at least one second sprocket, the inner diameter of which is smaller than an outer diameter of the receiving body and which is designed in an unsupported manner and connected to the receiving body in a torque-transmitting manner by means of the first sprocket.

13 Claims, 23 Drawing Sheets

(56) References Cited

U.S. PATENT DOCUMENTS

| | | | | |
|---|---|---|---|---|
| 6,428,437 B1* | 8/2002 | Schlanger | | B62M 9/10 474/160 |
| 6,488,603 B2* | 12/2002 | Lim | | F16D 41/30 192/64 |
| 6,923,741 B2* | 8/2005 | Wei | | B62M 9/10 474/152 |
| 7,011,592 B2* | 3/2006 | Shahana | | B62M 9/10 474/152 |
| 7,351,171 B2* | 4/2008 | Kanehisa | | B60B 27/026 301/111.02 |
| 7,931,553 B2* | 4/2011 | Tokuyama | | B62M 9/10 474/144 |
| 7,959,529 B2* | 6/2011 | Braedt | | B62M 9/10 474/152 |
| 8,057,338 B2* | 11/2011 | Kamada | | B62M 9/10 474/152 |
| 8,100,795 B2* | 1/2012 | Reiter | | B62M 9/10 474/160 |
| 8,197,371 B2* | 6/2012 | D'Aluisio | | B62M 9/12 301/110.5 |
| 8,663,044 B2* | 3/2014 | Lin | | B62M 9/10 474/160 |
| 8,821,330 B2* | 9/2014 | Dal Pra' | | B62M 9/10 474/160 |
| 8,911,314 B2* | 12/2014 | Braedt | | B62M 9/10 474/160 |
| 2001/0039224 A1* | 11/2001 | Lim | | F16D 41/30 474/160 |
| 2003/0064844 A1* | 4/2003 | Lin | | B62M 9/10 474/160 |
| 2004/0043855 A1* | 3/2004 | Wei | | B62M 9/10 474/160 |
| 2004/0121867 A1* | 6/2004 | Reiter | | B62M 9/10 474/160 |
| 2004/0142782 A1* | 7/2004 | Kamada | | B60B 27/026 474/160 |
| 2005/0009654 A1* | 1/2005 | Kanehisa | | B60B 27/026 474/152 |
| 2005/0119080 A1* | 6/2005 | Wei | | B62M 9/10 474/160 |
| 2006/0258499 A1* | 11/2006 | Kamada | | B62M 9/12 474/160 |
| 2007/0054770 A1* | 3/2007 | Valle | | B62M 9/10 474/160 |
| 2008/0004143 A1* | 1/2008 | Kanehisa | | B62M 9/10 474/160 |
| 2008/0058144 A1* | 3/2008 | Oseto | | B62M 9/10 474/160 |
| 2008/0188336 A1* | 8/2008 | Tokuyama | | B62M 9/10 474/160 |
| 2009/0042679 A1* | 2/2009 | Valle | | B62M 9/10 474/152 |
| 2009/0042681 A1* | 2/2009 | Dal Pra' | | B62M 9/10 474/160 |
| 2009/0042682 A1* | 2/2009 | Dal Pra' | | F16H 55/30 474/160 |
| 2009/0215566 A1* | 8/2009 | Braedt | | B62M 9/10 474/160 |
| 2010/0009794 A1* | 1/2010 | Chiang | | B62M 9/10 474/160 |
| 2010/0075791 A1* | 3/2010 | Braedt | | B62M 9/10 474/160 |
| 2010/0099530 A1* | 4/2010 | Chiang | | B62M 9/10 474/160 |
| 2011/0092327 A1* | 4/2011 | Oishi | | B62M 9/10 474/160 |
| 2011/0105263 A1* | 5/2011 | Braedt | | B62M 9/10 474/160 |
| 2011/0130233 A1 | 6/2011 | Tokuyama et al. | | |
| 2012/0208662 A1* | 8/2012 | Braedt | | B62M 9/10 474/160 |
| 2012/0220402 A1* | 8/2012 | D'Aluisio | | B62M 9/12 474/160 |
| 2012/0225745 A1* | 9/2012 | Oishi | | B62M 9/10 474/160 |
| 2012/0244976 A1* | 9/2012 | Lin | | B62M 9/10 474/160 |
| 2012/0244977 A1* | 9/2012 | Liao | | B62M 9/10 474/160 |
| 2012/0244978 A1* | 9/2012 | Liao | | B62M 9/10 474/160 |
| 2012/0277045 A1* | 11/2012 | Valle | | B62M 9/10 474/156 |
| 2012/0302384 A1* | 11/2012 | Braedt | | B62M 9/10 474/160 |
| 2012/0309572 A1* | 12/2012 | Braedt | | B62M 9/10 474/160 |
| 2012/0322598 A1* | 12/2012 | Lin | | B62M 9/10 474/160 |
| 2013/0017914 A1* | 1/2013 | Braedt | | B62M 9/10 474/160 |
| 2013/0225343 A1* | 8/2013 | Spahr | | B62M 9/10 474/160 |
| 2014/0179474 A1* | 6/2014 | Florczyk | | B62M 9/10 474/160 |
| 2014/0302956 A1* | 10/2014 | Dal Pr | | B62M 9/10 474/160 |
| 2015/0018151 A1* | 1/2015 | Dal Pr | | F16H 55/30 474/160 |
| 2015/0133249 A1* | 5/2015 | Tsai | | B62M 9/12 474/160 |
| 2016/0059932 A1* | 3/2016 | Braedt | | B62M 9/10 474/160 |

FOREIGN PATENT DOCUMENTS

| | | |
|---|---|---|
| DE | 102007010456 A1 | 12/2007 |
| DE | 102007006852 A1 | 4/2008 |
| DE | 102010027228 A1 | 5/2011 |
| DE | 102011103489 A1 | 12/2012 |
| DE | 102011107162 A1 | 1/2013 |
| DE | 102012016608 A1 | 2/2013 |
| EP | 0834450 | 4/1998 |
| EP | 1342657 | 9/2003 |
| JP | S63139092 U | 9/1988 |

* cited by examiner

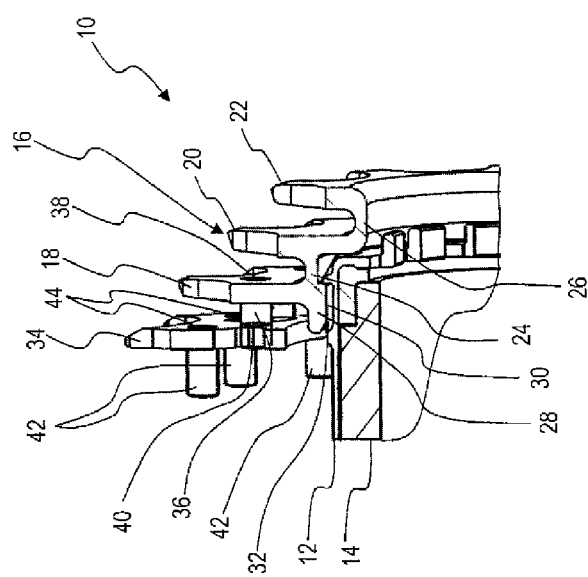

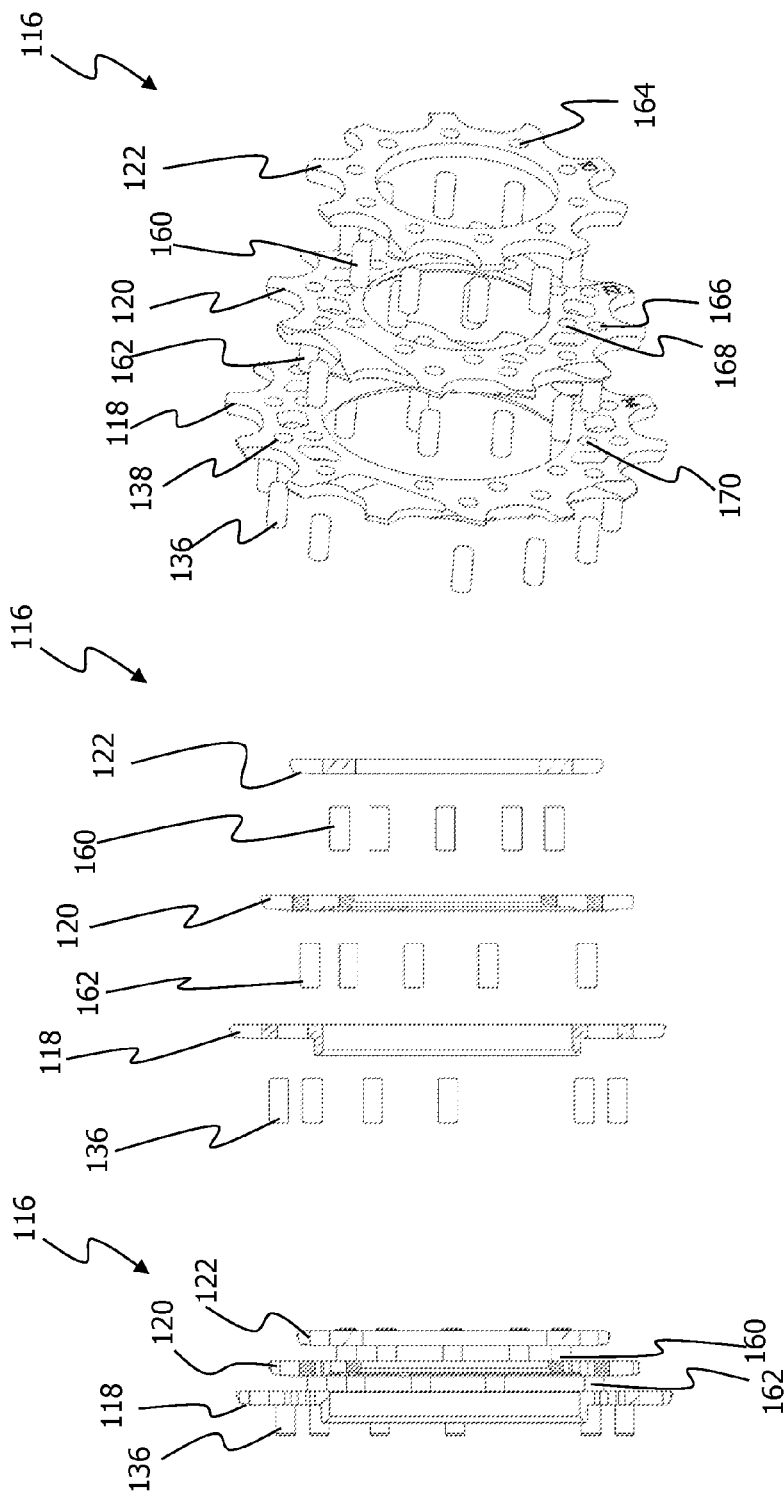

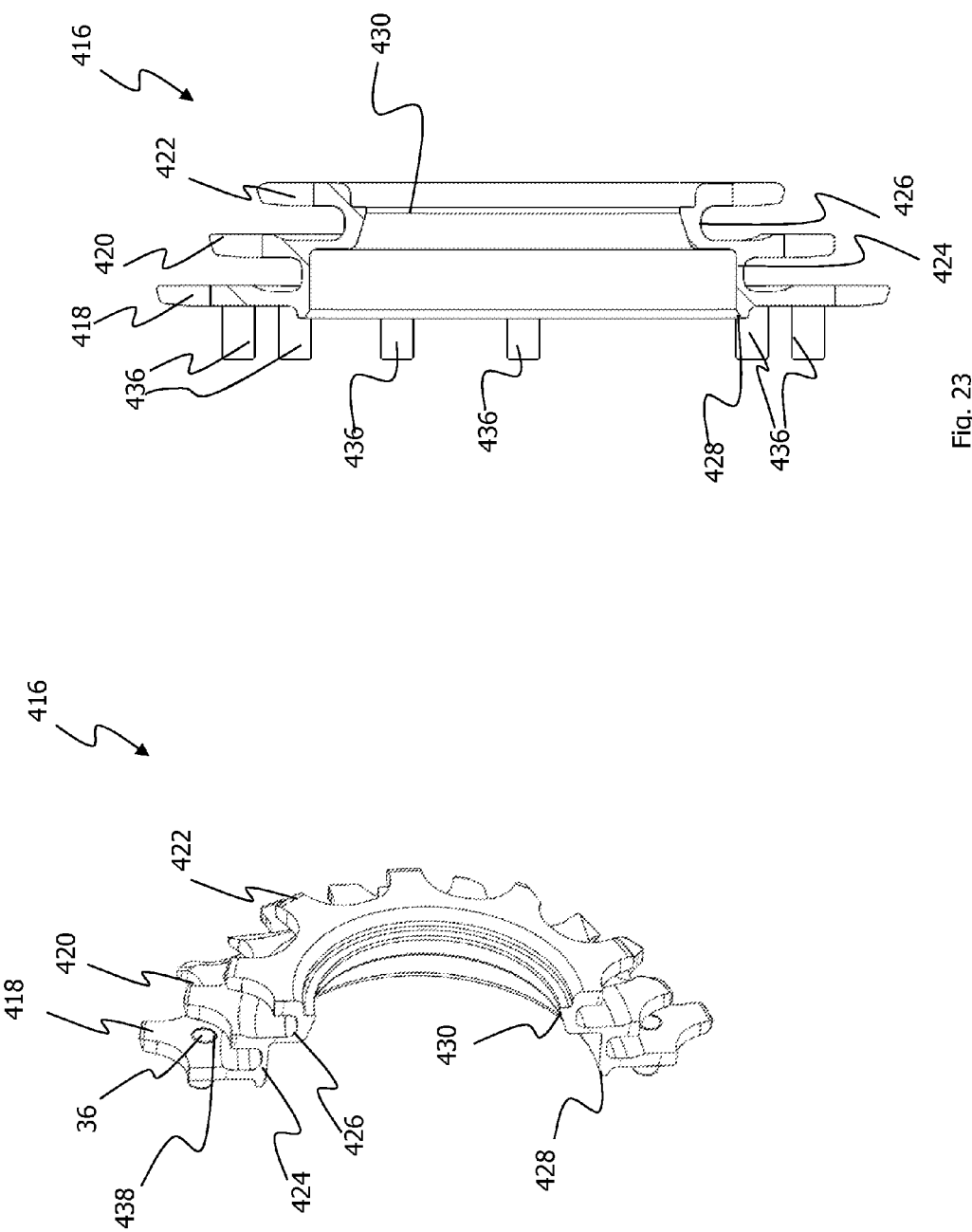

MULTIPLE-SPROCKET ARRANGEMENT FOR A BICYCLE GEARING

BACKGROUND OF THE INVENTION

The invention relates to a multiple-sprocket arrangement provided for mounting on a rear wheel axle of a bicycle. The invention further relates to a rear wheel axle arrangement for a bicycle provided with such a multiple-sprocket arrangement.

Multiple-sprocket arrangements for bicycle gearings on rear wheel axles are usually mounted rotatably on the rear wheel axis of a bicycle by means of a drive mechanism and a bearing arrangement. The drive mechanism meshes with a hub sleeve in a torque transmitting manner by means of a freewheel clutch and allows for torque transmission in one rotational direction (drive direction), whereas in the other direction, the drive mechanism is rotationally decoupled from the hub sleeve in order to provide freewheeling. In highly developed bicycle gearings, as already used in professional cycling as well as by recreational cyclists, the number of sprockets increases constantly. To some extent, relatively large increments but particularly also relatively small increments are used in order to allow for an optimal gear ratio for riding on flat terrain or in a group with constant cadence. In both cases, i.e. when narrow increments with small gear ratio jumps are provided or large increments are to be provided, there is an increasing demand for very small sprockets, i.e. sprockets with 10 teeth or less. However, such small sprockets can no longer be mounted on a conventional drive mechanism.

In DE 10 2011 107 162 A1, a multiple-sprocket arrangement is provided with a drive mechanism which has a section with reduced outer diameter. The section of the drive mechanism with reduced outer diameter is provided with a male thread with which an adapter provided with a female thread can be screwed to the drive mechanism. At least one sprocket with an inner diameter which is smaller than the outer diameter of the drive mechanism is thus connectable with the drive mechanism using the adapter.

Further prior art can be found in the documents EP 1 342 657 B1, DE 201 16 764 U1, EP 0 834 450 B1, and DE 10 2011 103 489 A1.

BRIEF SUMMARY OF THE INVENTION

The problem addressed by the invention is that of providing a multiple-sprocket arrangement which has small sprockets but a simple design and low weight. Furthermore, the problem addressed by the invention is that of specifying a rear wheel axle arrangement for a bicycle provided with such a multiple-sprocket arrangement.

The problem is solved by a multiple-sprocket arrangement with the features of the devices set out in the claims.

Further embodiments of the invention are described in the dependent claims.

A multiple-sprocket arrangement provided for mounting on a rear wheel axle of a bicycle has a receiving body which is designed for mounting on the rear wheel axle and to which individual sprockets of the multiple-sprocket arrangement can be attached. For example, the receiving body can have a sleeve-like design and be designed to be connected to a hub sleeve.

The element denoted herein as "hub sleeve" is frequently also called "drive mechanism" in the field of bicycle technology.

The multiple-sprocket arrangement further comprises a sprocket assembly with a first sprocket, the inner diameter of which is greater than the outer diameter of the receiving body. The first sprocket is connected to the receiving body. For example, the first sprocket can be connected to the receiving body in the region of an outer circumference of the receiving body by means of a connecting device provided in the region of the inner circumference of the first sprocket. The sprocket assembly is radially supported by the receiving body. The sprocket assembly is radially supported by the receiving body in the region of the inner circumference of the first sprocket. At least in this region, the first sprocket is in contact with the receiving body.

The sprocket assembly further comprises at least one second sprocket, the inner diameter of which is smaller than the outer diameter of the receiving body. The second sprocket is designed in an unsupported manner and connected to the receiving body by means of the first sprocket.

In other words, with the sprocket assembly of the multiple-sprocket arrangement, there is no direct connection between the at least one second sprocket of the sprocket assembly and the receiving body. Instead, the at least one second sprocket is designed in an unsupported manner and coupled with the receiving body merely by means of the first sprocket.

Preferably, the first sprocket has a greater number of teeth than the at least one second sprocket and, as seen in the direction of the rear wheel axle, is arranged adjacent to the at least one second sprocket at a defined distance from the at least one second sprocket. Furthermore, the first and the at least one second sprocket can be designed as one piece. Alternatively, the first sprocket and the at least one second sprocket can also be connected to one another by means of retaining bolts or other connecting means. For connecting the first sprocket with the adjacent second sprocket, a first flange section or a retaining bolt extending parallel to the rear wheel axle can be provided. In particular, the first flange section or the retaining bolt can extend between a shoulder of the first sprocket which faces the at least one second sprocket and a shoulder of the at least one second sprocket which faces the first sprocket. As a result, the first flange section also determines the distance of the first sprocket from the at least one second sprocket.

The above-mentioned and claimed diameter selection of the first and second sprocket allows for a secure fastening of the first sprocket on the receiving body and to span the receiving body at the front, wherein the second sprocket is thus arranged axially in front of the receiving body and correspondingly small, i.e. it can be designed with a smaller diameter than the receiving body.

Since the at least one second sprocket has a smaller inner diameter than the first sprocket, the distance from the first flange section to the inner circumference of the first sprocket, in radial direction, is preferably shorter than to an inner circumference of the at least one second sprocket. The first flange section can be designed in the form of continuous ring in order to particularly firmly connect the first sprocket to the at least one second sprocket. However, it is also conceivable to provide the first flange section with cutouts in order to reduce the weight of the sprocket assembly.

In a particularly preferred embodiment of the multiple-sprocket arrangement, the sprocket assembly comprises two second sprockets, i.e., two sprockets with smaller diameters are arranged "axially upstream" of the first sprocket. However, if desired, the sprocket assembly can also comprise more than two second sprockets with correspondingly smaller outer diameter. In a sprocket assembly with two second sprockets, the two second sprockets preferably have a different number of teeth, wherein the second sprocket with the greater number of teeth is preferably arranged between the second sprocket with the smaller number of teeth and the first sprocket of the sprocket assembly. The at least two second sprockets can be connect with one another using separate connecting means. For example, the connecting means can be retaining bolts or similar retaining means. The two second sprockets of the sprocket assembly can be connected with one another by means of a second flange section extending parallel to the rear wheel axle. The retaining means or the second flange section can preferably extend between two shoulders of the two second sprockets facing one another. As a result, the axial distance between the two second sprockets is determined by the connecting means or the second flange section. As mentioned above, the connecting means can be retaining bolts.

Furthermore, spacers can be provided between adjacent sprockets of the sprocket assembly. The spacers can adjust a predetermined distance in axial direction between the first sprocket and the second sprocket and between the two second sprockets. The spacers can be designed so as to be annular and bear against axial surfaces of adjacent sprockets. The spacers can be connected to the retaining bolts or are held by the retaining bolts between the adjacent sprockets of the sprocket assembly. For such purpose, the spacers have recesses for receiving the retaining bolts at least in sections.

In principle, it is conceivable that the two or more second sprockets have different inner diameters. In particular, the second sprocket with the lower number of teeth can have a smaller inner diameter than the second sprocket with the greater number of teeth. In radial direction, the distance from the second flange section to an inner circumference of the second sprocket with the greater inner diameter is shorter than the distance to an inner circumference of the second sprocket with the smaller inner diameter.

However, alternatively, it is also conceivable to provide the sprocket assembly of the multiple-sprocket arrangement with two second sprockets which have the same inner diameters. The second flange section preferably connects the inner circumference surfaces of the two second sprockets. Similar to the first flange section, the second flange section can also be designed in the form of a continuous ring in order to firmly connect the two second sprockets. However, it is also conceivable to provide the second flange section with cutouts in order to reduce the weight of the sprocket assembly.

The first sprocket of the sprocket assembly can be provided with a snap-in protrusion in the region of its inner circumference. As seen in the direction of the rear wheel axle, the snap-in protrusion can be wider than the first sprocket itself. In order to realize such a configuration, the first sprocket is preferably provided with a third flange section which preferably extends parallel to the rear wheel axle in a direction which is facing away from the at least one second sprocket to a shoulder of the first sprocket facing away from the at least one second sprocket. The snap-in protrusion can thus be provided on an inner circumference surface of the third flange section. However, it is also conceivable to provide the third flange section with cutouts in order to reduce the weight of the sprocket assembly.

In the region of its outer circumference, the receiving body can be provided with a locking groove preferably designed for meshing with the snap-in protrusion of the first sprocket. When the snap-in protrusion provided on the first sprocket meshes with the locking groove of the receiving body, the first sprocket and thus the entire sprocket assembly is connected to the receiving body. Such a snap-in locking device allows for a particularly simple mounting of the sprocket assembly on the receiving body.

According to an embodiment of the invention, the sprocket assembly or the first sprocket can be connected to the receiving body by means of a retaining element arranged on the receiving body. For example, the retaining element can be a retaining ring. The retaining ring can be received by a retaining groove in the receiving body. The retaining groove can be delimited by two retaining collars which can be provided on the outer circumference of the receiving body. The retaining ring can extend around the outer circumference of the receiving body.

Furthermore, the receiving body can be firmly connected to the first sprocket of the sprocket assembly. In such case, the receiving body can have a multi-piece design. The receiving body can be axially secured on the hub sleeve by means of a retaining element. For example, the retaining element can be screwed to the hub sleeve for fastening the receiving body.

However, it must be expressly stated that the present invention is also used for solution which have no tubular receiving body but in which the torque is transmitted directly from the sprocket assembly to a hub shell, as, for example, described in the prior art according to DE 10 2011 103 489 A1 by the applicant. Express reference to said document is made at this point.

In one embodiment, the multiple-sprocket arrangement can comprise at least one further sprocket which is connected to the sprocket assembly by means of at least one retaining bolt which extends parallel to the rear wheel axle. The further sprocket and the sprocket assembly are connected in a torque transmitting manner by means of a (first) retaining bolt connecting the at least one further sprocket with the sprocket assembly.

The further sprocket can be formed and connected to the sprocket assembly by means of a first retaining bolt extending parallel to the rear wheel axle such that its inner circumference is arranged at a distance from the outer circumference of the receiving body. The further sprocket can thus have an inner diameter which significantly exceeds the outer diameter of the receiving body and a particularly lightweight design. This allows for a further reduction of the overall weight of the multiple-sprocket arrangement. Furthermore, providing the receiving body with corresponding bearing and fastening devices for a torque-transmitting connection of the further sprocket to the receiving body can thus be foregone. As a result, the receiving body can also have a simpler and more lightweight design.

The retaining bolts extending parallel to the rear wheel axle can engage in receiving bores provided in the corresponding sprockets. This results in a secure and lightweight torque-transmitting connection between the further sprocket and the sprocket assembly.

The multiple-sprocket arrangement can further comprise at least one second retaining bolt extending parallel to the rear wheel axle, with which an additional sprocket is connected to the further sprocket and connected in a torque-transmitting manner to the sprocket assembly by means of the further sprocket.

This additional further sprocket, similar to the further sprocket, can be formed and connected to the further sprocket by means of the at least one second retaining bolt extending parallel to the rear wheel axle such that its inner circumference is arranged at a distance from the outer circumference of the receiving body. The additional sprocket, which preferably has a greater number of teeth than the further sprocket, can also be designed so as to be particularly lightweight.

The at least one second retaining bolt extending parallel to the rear wheel axle engages preferably in receiving bores provided in the additional sprocket and the further sprocket, thus creating a secure and lightweight connection between the additional sprocket and the further sprocket.

A development of the invention provides that the retaining bolts are arranged radially in a region within a tooth tip of the next smallest sprocket. The retaining bolt is thus connected to the appropriate sprocket in a region which provides sufficient material for securing the retaining bolt and transmitting the forces generated during torque transmission.

If necessary, the multiple-sprocket arrangement can comprise any number of further sprockets which each can have any number of teeth. Each further sprocket can be connected to further sprockets axially adjacent in the direction of the sprocket assembly and eventually connected to the sprocket assembly, i.e. the first sprocket of the sprocket assembly, by means of at least one corresponding retaining bolt in order to provide a torque-transmitting connection between the further sprockets. Each further sprocket can be formed and connected to a further sprocket axially adjacent in the direction of the sprocket assembly by means of the at least one retaining bolt such that its inner circumference is arranged at a distance from the outer circumference of the receiving body. The further sprockets are supported by the receiving body by means of the sprocket assembly. Particularly the first sprocket of the sprocket assembly is used for radial support since it is connected to the receiving body. Torque is transmitted between the sprocket assembly and the hub sleeve by means of the sprocket with the greatest number of teeth or the sprocket with the largest diameter. Such sprocket is connected in a torque-transmitting manner with the hub sleeve. For example, the hub sleeve can have external teeth which mesh with corresponding internal teeth of the largest sprocket.

A rear wheel axle arrangement, according to the invention, for a bicycle comprises a rear wheel axle designed to be mounted on a bicycle frame. The rear wheel axle arrangement further comprises a hub sleeve rotatably mounted on the rear wheel axle. An above described multiple-sprocket arrangement of the rear wheel axle arrangement acts together with a drive chain. Lastly, the rear wheel axle arrangement is provided with a torque transmission arrangement for directionally selectively transmitting a torque from the multiple-sprocket arrangement to the hub sleeve in order to realize a freewheel function.

BRIEF DESCRIPTION OF THE SEVERAL VIEWS OF THE DRAWINGS

In the following, examples of embodiments of the invention are described in further detail using the attached schematic drawings. The drawings show:

FIG. 1 is a section of a multiple-sprocket arrangement for mounting on a rear wheel axle of a bicycle according to a first embodiment of the invention;

FIG. 2 is a cutaway view of a sprocket assembly of the multiple-sprocket arrangement according to FIG. 1;

FIGS. 8-10a, 10b, 10c are views of a sprocket assembly according to a second embodiment of the invention;

FIGS. 22, 23 are views of a sprocket assembly according to a fifth embodiment of the invention;

DETAILED DESCRIPTION OF THE INVENTION

Figure 3:
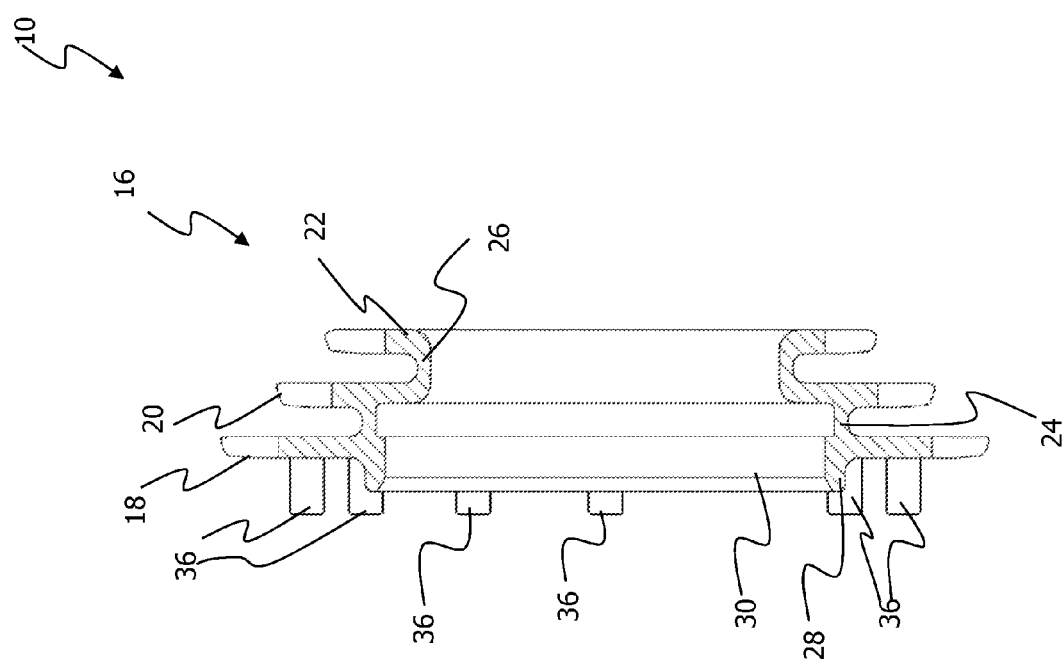
FIG. 3 is a cutaway view of a sprocket assembly according to the first embodiment of the invention.

A multiple-sprocket arrangement 10 depicted in FIGS. 1 to 7 comprises a receiving body 12 designed for mounting on a not depicted rear wheel axle. In particular, the receiving body 12 is provided to be mounted on a hub sleeve 14 by means of a torque transmission arrangement (also not depicted) for directionally selectively transmitting a torque from the multiple-sprocket arrangement 10 to the hub sleeve 14. In drive direction, the torque transmission arrangement allows for a transmission of a torque from the multiple-sprocket arrangement 10 to the hub sleeve 14. However, in a rotational direction opposite to the drive direction, the torque transmission arrangement rotationally decouples the multiple-sprocket arrangement 10 from a not depicted hub shell, realizing a freewheel function.

A sprocket assembly 16 of the multiple-sprocket arrangement 10 (see also FIG. 2), which in the following will be described in detail, comprises a first sprocket 18, a second sprocket 20, and a further second sprocket 22. The first sprocket 18 has a greater number of teeth than the second sprocket 20. However, the second sprocket 20 has a greater number of teeth than the further second sprocket 22. The sprocket assembly 16 is designed as one piece, i.e. the first sprocket 18, the second sprocket 20, and the further second sprocket 22 are designed integral with one another.

The first sprocket 18 has an inner diameter which is greater than an outer diameter of the receiving body 12 and is connected to the receiving body 12. By contrast, the two second sprockets 20, 22 each have an inner diameter which is smaller than an outer diameter of the receiving body 12. Both second sprockets 20, 22 are designed in an unsupported manner, i.e. they are not directly connected in a torque-transmitting manner to the hub sleeve 14. Instead, a torque-transmitting connection is provided between the two second sprockets 20, 22 and the receiving body 12 by means of the first sprocket 18 of the sprocket assembly 16 and the adjacent sprocket cluster 34, as shall be described in the following in further detail.

The sprocket assembly 16 has a first flange section 24 designed in the form of a continuous ring which extend parallel to the rear wheel axle between the first sprocket 18 and the second sprocket 20. In particular, the first flange section substantially extends perpendicularly to shoulders of the first sprocket 18 and the second sprocket 20 positioned opposite each other, wherein a distance of the first flange section 24 from an inner circumference of the first sprocket 18 is shorter than a distance of the first flange section 24 from an inner circumference of the second sprocket 20.

The second sprocket 20 and the further second sprocket 22 have the same inner diameters. A second flange section 26 which is also designed in the form of a continuous ring and, similar to the first flange section 24, extends parallel to the rear wheel axle and substantially perpendicularly to shoulders of the two second sprockets 20, 22 positioned opposite each other, connects an inner circumference surface of the second sprocket 20 with an inner circumference surface of the further second sprocket 22.

For the radially supporting connection of the sprocket assembly 16 with the receiving body 12, the first sprocket 18 is provided with a third flange section 28 which extends parallel to the rear wheel axle in the direction facing away from the two second sprockets 20, 22 in the region of the inner circumference of the first sprocket 18 from a shoulder of the first sprocket 18 facing away from the two second sprockets 20, 22. The third flange section 28 is also designed in the form of a continuous ring. A snap-in protrusion 30 is provided in the region of an inner circumference surface of the third flange section 28 which meshes with a locking groove 32 provided in the region of an outer circumference of the receiving body 12. The snap-in locking device formed by the snap-in protrusion 30 and the locking groove 32 allows for a secure axial connection of the sprocket assembly 16 with the receiving body 12 without excessively increasing the weight of the sprocket assembly 16.

A further sprocket 34 of the multiple-sprocket arrangement 10 has a greater number of teeth than the first sprocket 18 of the sprocket assembly 16. The further sprocket 34 is connected to the sprocket assembly 16, i.e. the first sprocket 18 of the sprocket assembly 16, by means of a plurality of first retaining bolts or pins 36 which extend parallel to the rear wheel axle. The first retaining bolts each engage in receiving bores 30, 40 provided in the further sprocket 34 and the first sprocket 18 of the sprocket assembly 16. The further sprocket 34 and the hub sleeve 14 are connected in a torque-transmitting manner by means of the sprocket assembly 16 or the first sprocket 18 of the sprocket assembly 16. Lastly, the multiple-sprocket arrangement 10 has a plurality of second retaining bolts 42 extending parallel to the rear wheel axle. The second retaining bolts or pins 42 are provided to connect an additional sprocket (FIG. 6), which has a greater number of teeth than the further sprocket 34, to the receiving body 12 by means of the further sprocket 34 and the sprocket assembly 16. The further sprocket 34 can be formed in a weight-saving manner such that its inner circumference is arranged at a distance from the outer circumference of the receiving body 12. The second retaining bolts 42 engage in receiving bores 44 provided in the further sprocket 34 and the receiving bores of the not depicted additional sprocket, thus providing a secure torque-transmitting connection between the additional sprocket and the further sprocket 34.

It is understood that the multiple-sprocket arrangement 10 can comprise any number of further sprockets 34 which each can have any number of teeth. Each further sprocket can be connected to further sprockets axially adjacent in the direction of the sprocket assembly 16 and eventually to the sprocket assembly 16, i.e. the first sprocket 18 of the sprocket assembly 16, by means of at least one corresponding retaining bolt. Each further sprocket can be formed and connected to a further sprocket axially adjacent in the direction of the sprocket assembly 16 by means of the at least one retaining bolt such that its inner circumference is arranged at a distance from the outer circumference of the receiving body 12. This applies to all further sprockets 34 except for the sprocket with the greatest number of teeth or the largest diameter. Said sprocket is connected directly and in a torque-transmitting manner to the hub sleeve 14, as shall be described in the following in further detail.

FIG. 3 shows a cutaway view of the sprocket assembly 16 with the first sprocket 18 and the two second sprockets 20 and 22. The first sprocket 18 is connected to the second sprocket 20 by means of the flange section 24. The second sprocket 20 is connected to the sprocket 22 by means of the flange section 26. Retaining bolts 36 are arranged on the first sprocket 18 and used for connecting to the further sprocket 34 (FIG. 1). A flange section 28 is provided on the first sprocket 18. The flange section 28 has the snap-in protrusion 30 which is designed in the form of a continuous ring and axially connects to the receiving body 12 (FIG. 1). The snap-in protrusion 30 secures the sprocket assembly 16 in axial direction on the receiving body 12.

Figure 4:
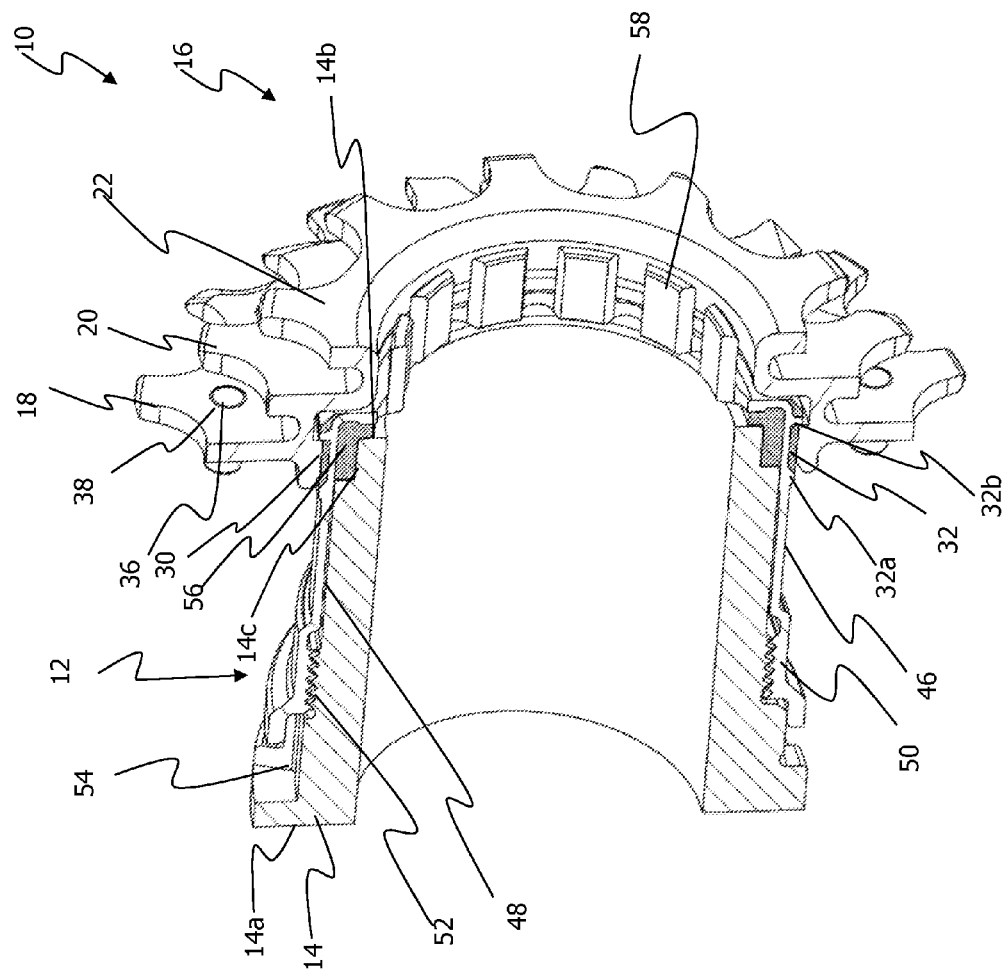
FIG. 4 is a perspective view of the multiple-sprocket arrangement according to the first embodiment of the invention.

FIG. 4 shows a perspective view of the multiple-sprocket arrangement 10 according to the first embodiment similar to FIG. 1.

The multiple-sprocket arrangement 10 comprises the receiving body 12, the hub sleeve 14, and the sprocket assembly 16. The sprocket assembly 16 is held on the receiving body 12 by means of the snap-in protrusion 30. The snap-in protrusion 30 meshes with the locking groove 32 on the receiving body 12 in order to secure the sprocket assembly 16 in axial direction of the multiple-sprocket arrangement 10 on the receiving body 12 or the hub sleeve 14. The locking groove 32 is delimited by two snap-in noses 32a and 32b for receiving the snap-in protrusion 30 between said snap-in noses 32a and 32b. Following the snap-in nose 32a, the receiving body 12 comprises s cylindrical section 46. When the receiving body 12 is slipped over the hub sleeve 14, the cylindrical section 46 joins the receiving body 12 with a cylindrical section 48 of the hub sleeve 14. In other words, an inner circumference surface of the cylindrical section 46 of the receiving body 12 and an outer circumference surface of the cylindrical section 48 of the hub sleeve 14 act together for guiding the receiving body 12. The cylindrical section 46 of the receiving body 12 is followed by a section with a female thread 50. A section 52 with a male thread is provided on the hub sleeve 14. The receiving body 12 can be screwed to the hub sleeve 14 by means of the threaded sections 50 and 52. The cylindrical sections 46 and 48 of the receiving body 12 and the hub sleeve 14 act as guide, and so the receiving body can be screwed to the hub sleeve 14 without jamming.

Between its front side 14a and the male threaded section 52, the hub sleeve 14 has external teeth 54 for torque transmission between a sprocket arrangement (not depicted in FIG. 4), comprising the sprocket assembly 16, and the hub shell 14. This shall be described in the following in further detail.

In the region of the end face 14b of the hub sleeve 14 and a shoulder 14c provided on the hub sleeve 14, a body 56 can be seen which is made of an elastomer or plastic. The body 56 is connected to the receiving body 12 or attached to the receiving body 12. The body 56, for example, can be produced by overmolding the receiving body 12 with an elastomer or plastic. On the right end of the receiving body 12 in FIG. 4, the body 56 forms an outer circumference surface section and an inner circumference surface section. The body 56 forms an annular sheathing for said section of the receiving body 12. The body 56 also extends into the locking groove 32. The body 56 radially and axially positions the receiving body 12 on the hub sleeve 14. Furthermore, the body 56 radially supports the sprocket assembly 16 on the receiving body 12 or in the locking groove 32.

The receiving body 12 comprises guide noses 58 which extend radially within the second sprockets 20 and 22 and can be used for guiding an axle or hub section.

Figure 5:
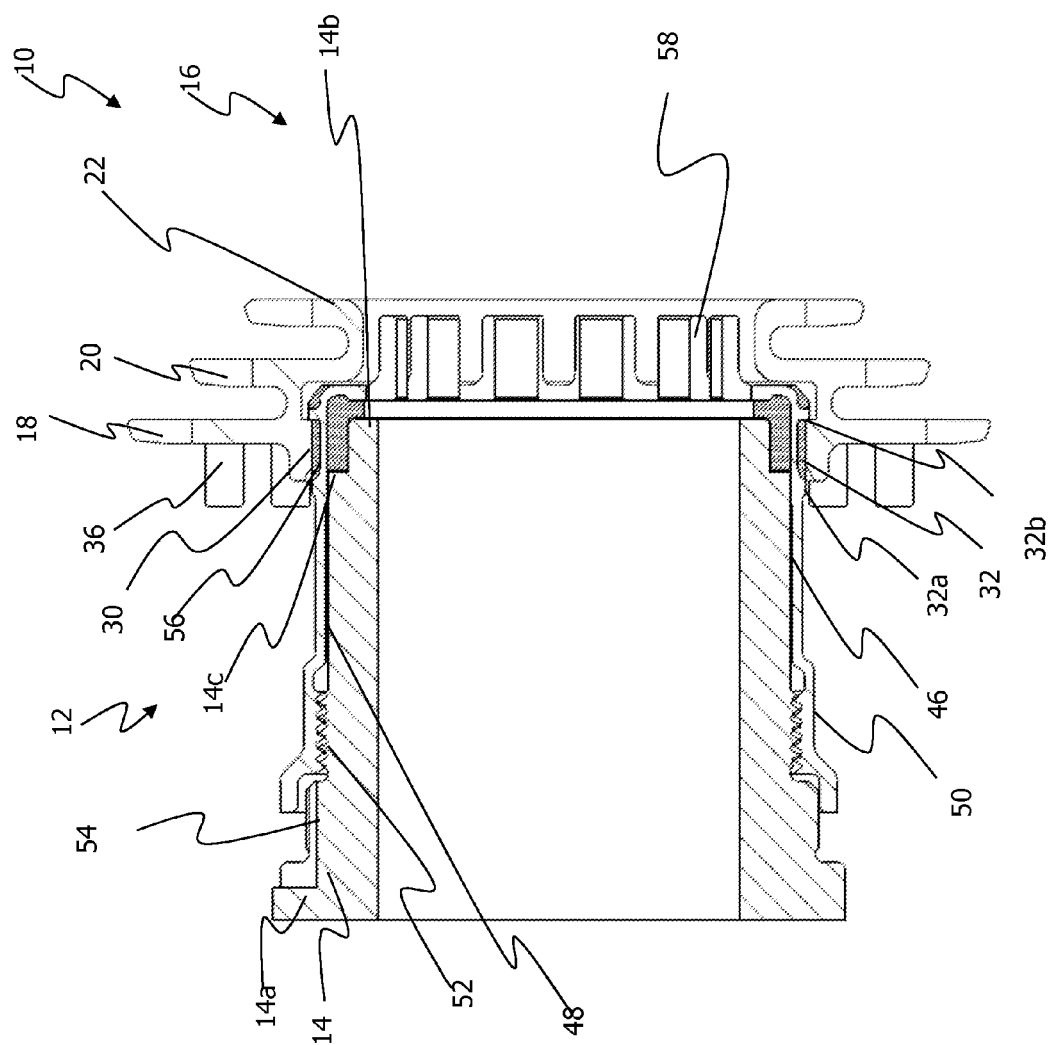
FIG. 5 is a cutaway view of the multiple-sprocket arrangement according to the first embodiment of the invention.

FIG. 5 shows a further cutaway view of the multiple-sprocket arrangement 10.

The sprocket assembly 16 is held on the receiving body 12 by the locking groove 32 with its two snap-in noses 32a and 32b. The body 56 axially and radially positions the receiving body 12 on the hub sleeve 14 and radially supports the sprocket assembly 16. The receiving body 12 is screwed to the hub sleeve by means of the threaded sections 50, 52. The outer teeth 54 transmit torque between the hub sleeve 14 and a sprocket arrangement comprising the sprocket assembly 16.

Figure 6:
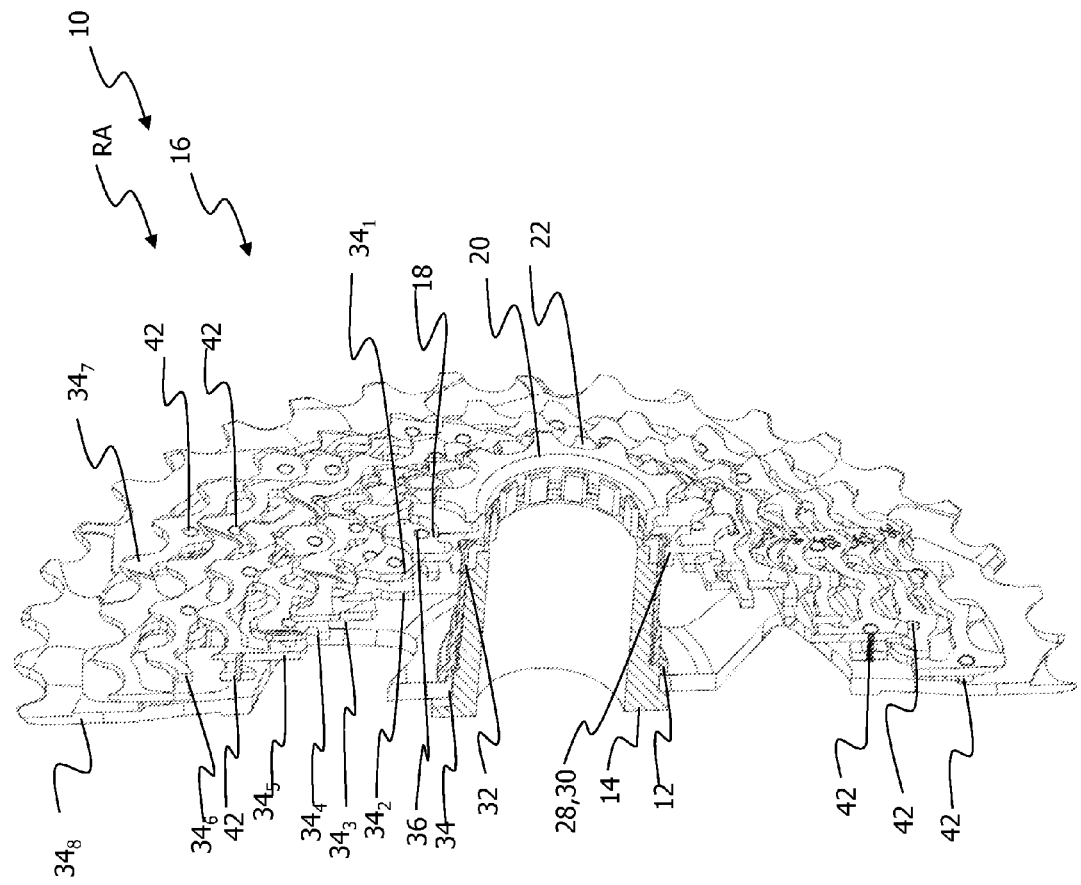
FIG. 6 is a further perspective view of the multiple-sprocket arrangement according to the first embodiment of the invention.

FIG. 6 shows a perspective view of the multiple-sprocket arrangement 10.

The multiple-sprocket arrangement 10 comprises the sprocket assembly 16 which is part of a sprocket arrangement RA. In addition to the sprocket assembly 16 with the sprockets 18, 20, and 22, the sprocket arrangement RA comprises a plurality of further sprockets $34_1$ to $34_8$. As can be seen in FIG. 6, the sprockets $34_1$ to $34_8$ are connected to one another using retaining bolts 42. Moreover, the sprocket $34_1$ is connected to the sprocket assembly 16 or the first sprocket 18 by means of the retaining bolts 36. The bolts 36 and 42 transmit torque between the individual sprockets $34_1$ to $34_8$ and transmit torque between the sprocket assembly 16 and the sprocket $34_1$.

The torque is transmitted from the sprocket assembly RA to the hub sleeve 14 by means of the sprocket $34_8$. For such purpose, the largest sprocket $34_8$ is connected to the hub sleeve 14. The sprocket $34_8$ has internal teeth (not depicted) which are provided complementary to the external teeth 56 on the hub sleeve 14. The sprocket $34_8$ is held in axial direction in its predetermined position on the external teeth 54 by means of the receiving body 12. For such purpose, the receiving body 12, with its front side opposite the guide noses 58, bears against the sprocket $34_8$ in the region of the inner circumference of the sprocket $34_8$.

Figure 7:
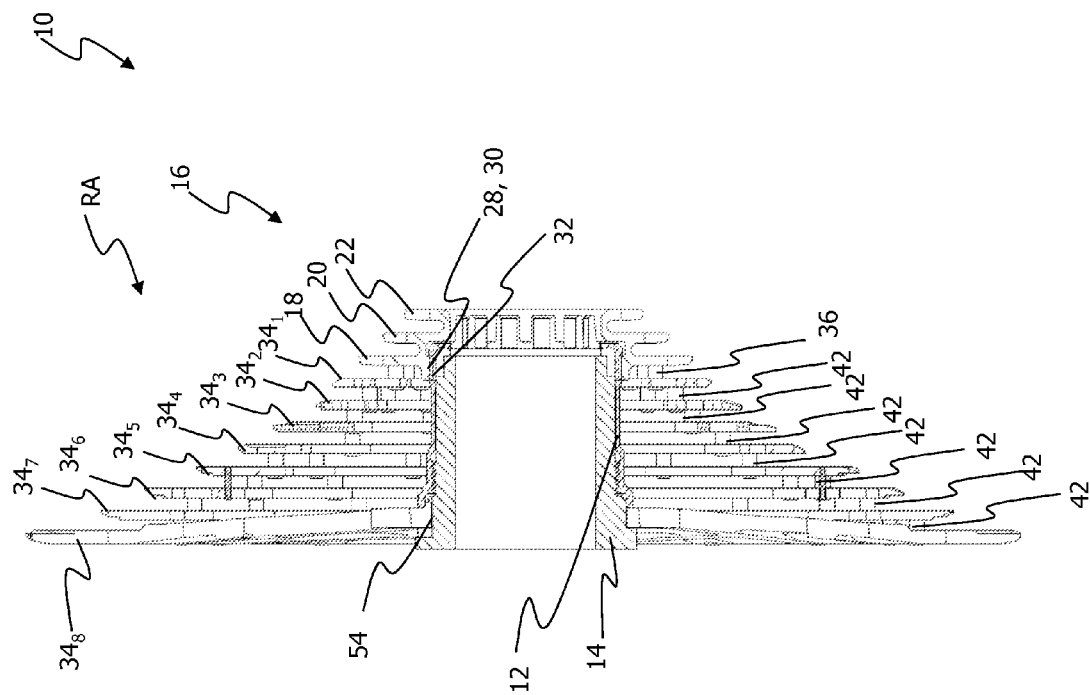
FIG. 7 is a further cutaway view of the multiple-sprocket arrangement according to the first embodiment of the invention.

FIG. 7 shows a cutaway view of the multiple-sprocket arrangement 10.

The sprocket assembly 16 is connected to the sprocket $34_1$ by means of the bolts 36. The sprockets $34_1$ to $34_8$ are, once again, connected to one another using retaining bolts 42. The bolts 36 and 42 extend parallel to the central axis of the multiple-sprocket arrangement 10. The bolts 36 and 42 transmit torque between the individual sprockets $34_1$ to $34_8$. The torque is transmitted from the sprocket $34_8$ to the hub sleeve 14 by means of the internal teeth of the sprocket $34_8$ which meshes with the external teeth 54 on the hub sleeve.

In the following, further embodiments of the invention shall be described with reference to the attached drawings. Similar or similarly operating features are denoted with the same reference signs but preceded by a further digit.

Figure 8:
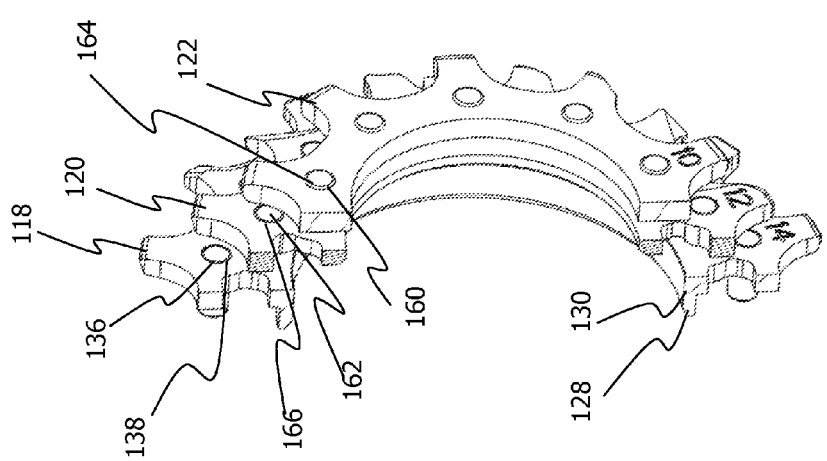

FIG. 8 shows a perspective view of the sprocket assembly 116 with the sprockets 118, 120, and 122 according to a second embodiment.

According to this embodiment, the sprockets 118, 120, and 122 are connected to one another using bolts 160 and 162. For such purpose, the sprockets 120 and 122 have receiving openings 164 and 166 for receiving the bolts 160, 162. Once again, a flange section 128 is provided on the first sprocket 118 which is provided with the snap-in protrusion 130. The receiving openings in the first sprocket 118 receive the corresponding bolts 162, wherein the receiving openings in the first sprocket 118 are not depicted in FIG. 8.

Figure 9:
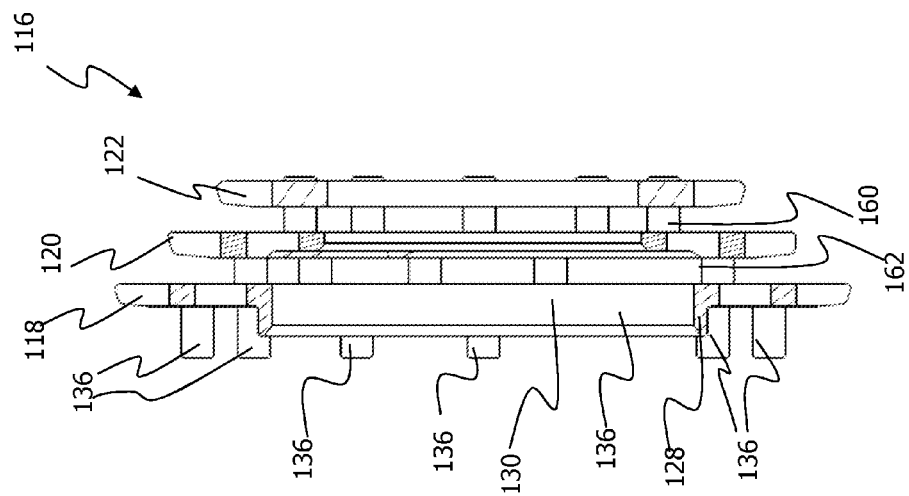

FIG. 9 shows a cutaway view of the sprocket assembly 116.

The sprockets 118, 120, and 122 are connected to one another using connecting bolts 160 and 162. The bolts or pins 160 extend between the sprockets 120 and 122. The bolts or pins 162 extend between the sprockets 120 and 118. The bolts or pins 136 are provided on the first sprocket 118 for connecting with further sprockets. The sprocket 118 has the flange section 128 with its snap-in protrusion 130.

FIG. 10 shows various views of the sprocket assembly 116 according to the second embodiment.

FIG. 10A corresponds to FIG. 9, and therefore a detailed description of FIG. 10A is foregone in order to avoid repetitions.

FIG. 10B shows the components of the sprocket assembly 116 in a disconnected state.

According to the second embodiment, the sprockets 118, 120, and 122 are designed as separate sprockets which are connected to one another using the bolts or pins 160 and 162. Furthermore, the bolts 136, which are used for connecting further sprockets, can be inserted in the sprocket 116.

FIG. 10C shows a perspective view of the sprocket assembly 116 in a disconnected state.

The sprocket 122 has receiving openings 164 for the bolts 160. In turn, the bolts 160 can be inserted in receiving openings 168 in the sprocket 120. The receiving openings 166 in the sprocket 120 receive the bolts 162. The bolts 162 connect the sprocket 120 with the sprocket 118. The receiving openings 170 in the sprocket 118 receive the bolts 162. Furthermore, the sprocket 118 has receiving openings 138 which receive the bolts 136. The bolts 136 can connect the sprocket assembly 116 with further sprockets.

Figure 11:
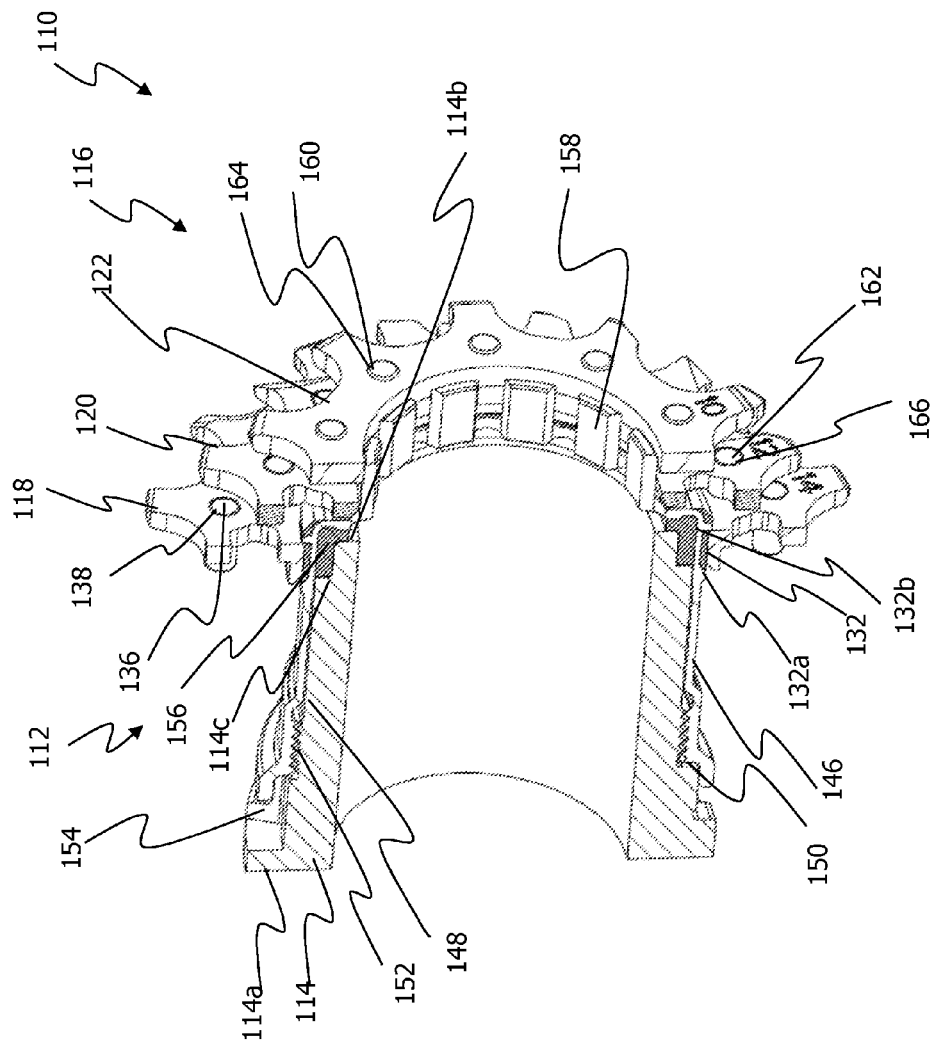
FIG. 11 is a perspective view of a multiple-sprocket arrangement according to the second embodiment of the invention.
Figure 12:
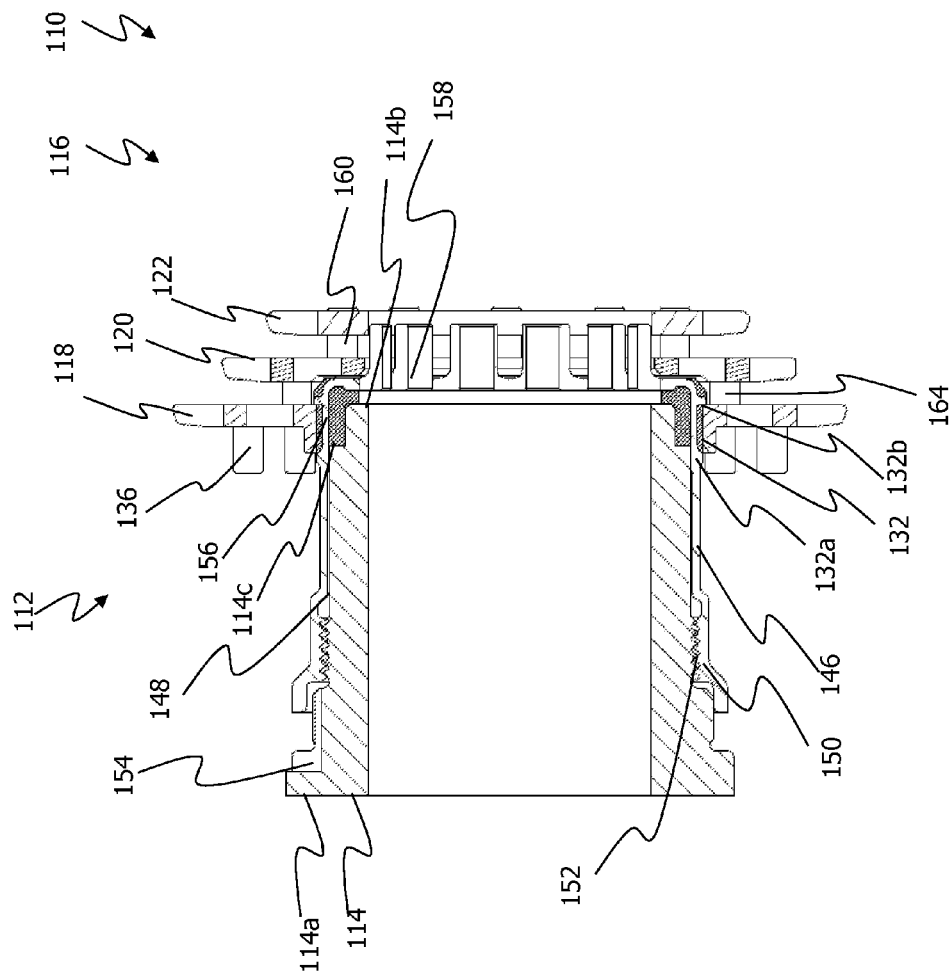
FIG. 12 is a cutaway view of the multiple-sprocket arrangement according to the second embodiment of the invention.

FIG. 11 shows a perspective view of the multiple-sprocket arrangement 110 with the sprocket assembly 116.

The essential difference between the first embodiment according to FIGS. 1 to 7 and the second embodiment according to figures up to 12 is that of the sprockets 118, 120, 122 of the sprocket assembly 116 being connected to one another using bolts 160 and 162.

The receiving body 112 and the hub sleeve 114 are identical with the receiving body 12 and the hub sleeve 14 according to the first embodiment.

In order to avoid repetitions, another detailed description of the receiving body 112 and the hub sleeve 114 is foregone and reference is made to the description with regard to the first embodiment.

Figure 13:
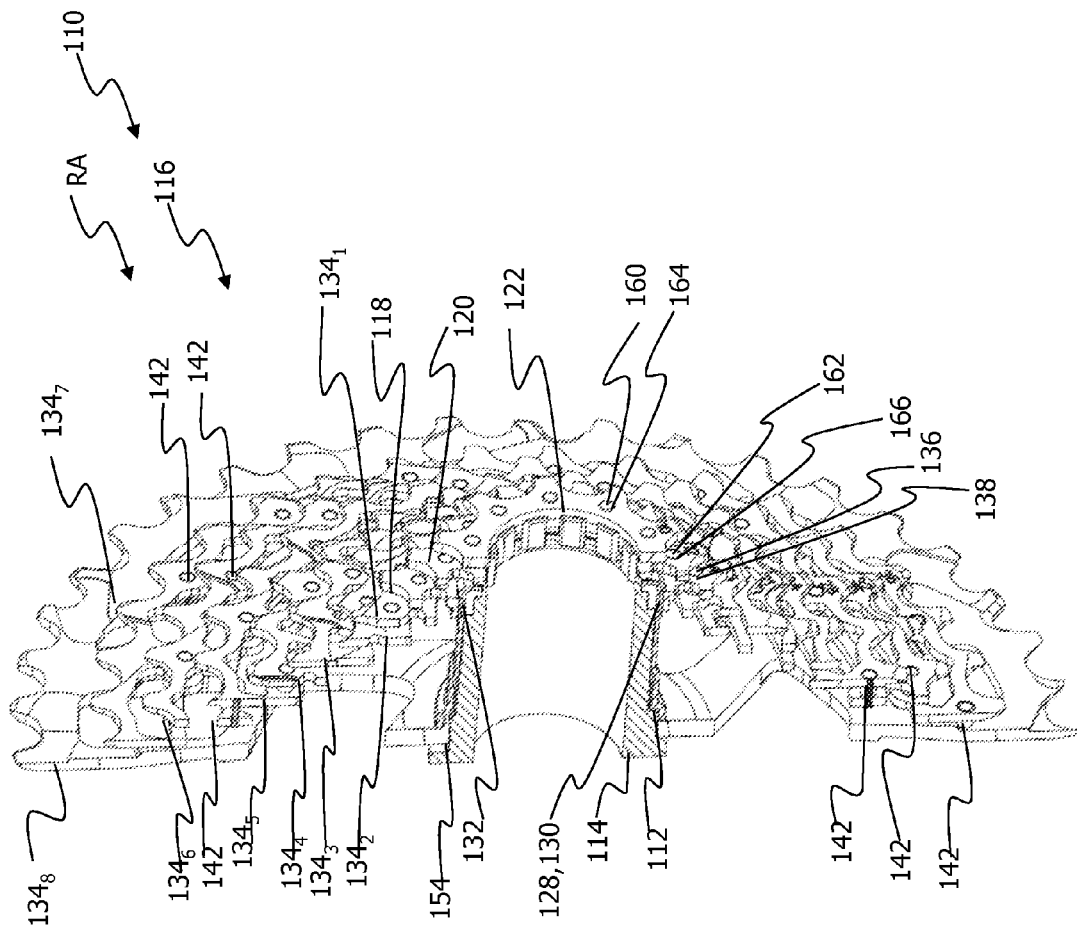
FIG. 13 is a perspective view of the multiple-sprocket arrangement according to the second embodiment of the invention.
Figure 14:
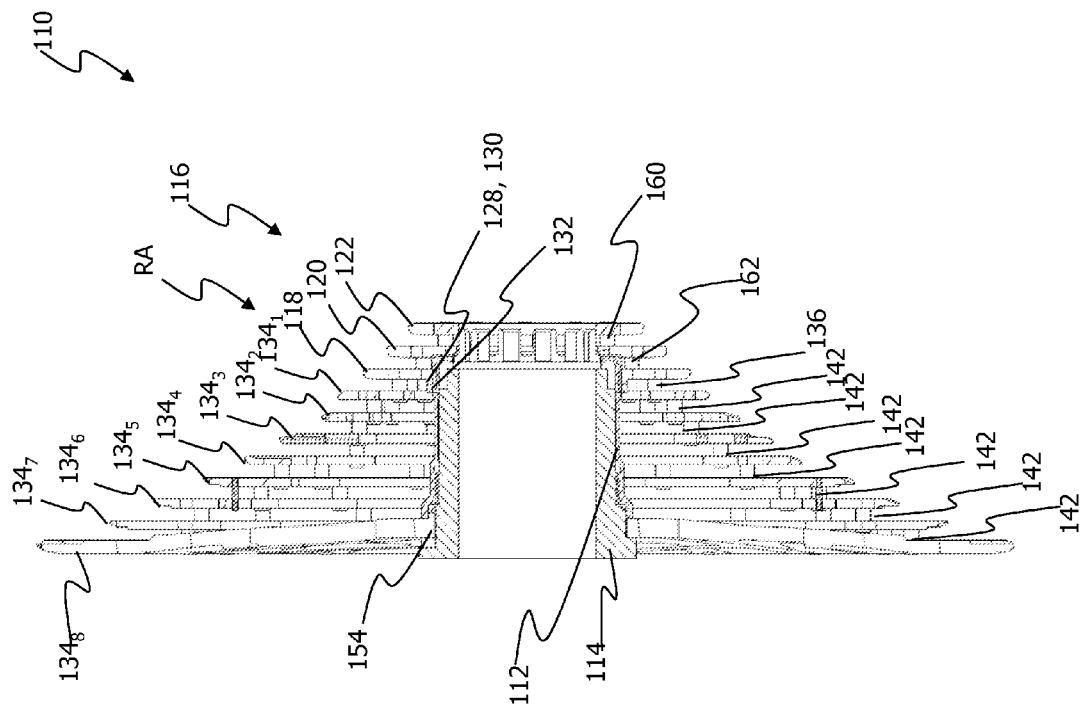
FIG. 14 is a further cutaway view of the multiple-sprocket arrangement according to the second embodiment of the invention.

FIGS. 13 and 14 show that all sprockets 118, 120, 122, $134_1$ to $134_8$ are connected to one another using the bolts 136, 142, 160, and 162. The torque transmission between the sprocket arrangement RA and the hub sleeve 114 is identical to the first embodiment.

FIG. 15 shows various views of a sprocket assembly 216 according to a third embodiment of the invention.

Figures 15A, 15B, 15C:
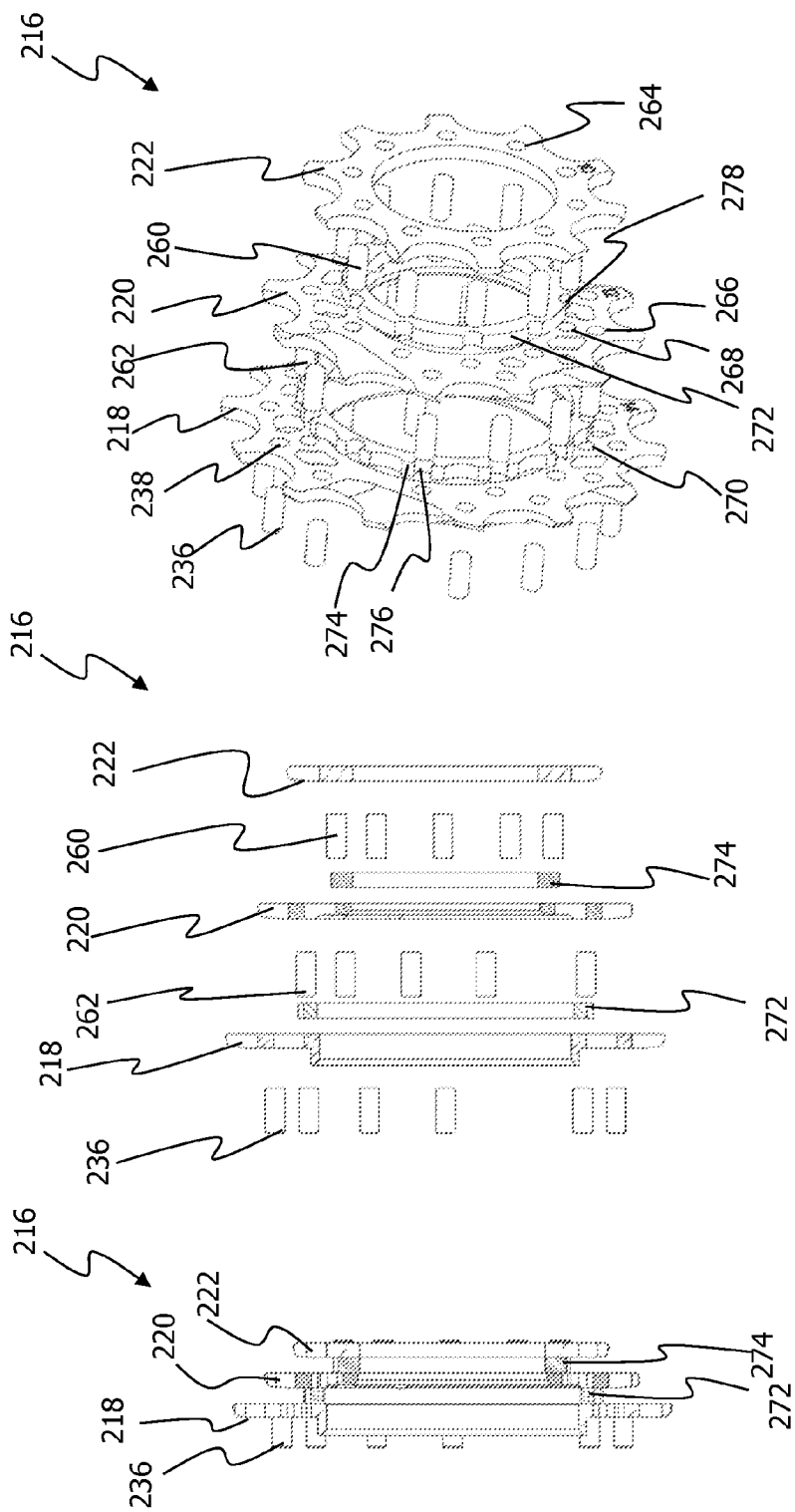
FIG. 15a-c are views of a sprocket assembly according to a third embodiment of the invention.

FIG. 15a shows the sprocket assembly 216 with its sprockets 218, 220, and 222. The sprockets 218, 220, and 222 are connected to one another using bolts (FIG. 15b). A spacer 272 is arranged between the sprockets 218 and 220. A further space 274 is arranged between the sprockets 220 and 222.

FIG. 15b shows the components of the sprocket assembly 216 in a disconnected state.

The sprockets 218 and 220 are connected using the bolts 262. A spacer 272 is provided between the sprockets 218 and 220 which is designed so as to be annular. The spacer 272 is held between the sprockets 218 and 220 using the bolts 262. A further spacer 274 is arranged between the sprockets 220 and 222 which is designed so as to be annular and is held between the sprockets 220 and 222 using the bolts 260.

FIG. 15c shows a perspective view of the components of the sprocket assembly 216 in a disconnected state.

The spacers 272 and 274 have semicircular recesses 276 and 278 which, in sections, can receive the bolts 262 and 260. The recesses 276 and 278 are provided on the outer circumference surfaces of the annular spacers 272 and 274. In a connected state, the spacers 272 and 274 are held between the corresponding sprockets 218, 220, and 222 using the bolts 260 and 262 and thus adjust a predetermined axial distance between the sprockets 218, 220, and 222.

Figure 16:
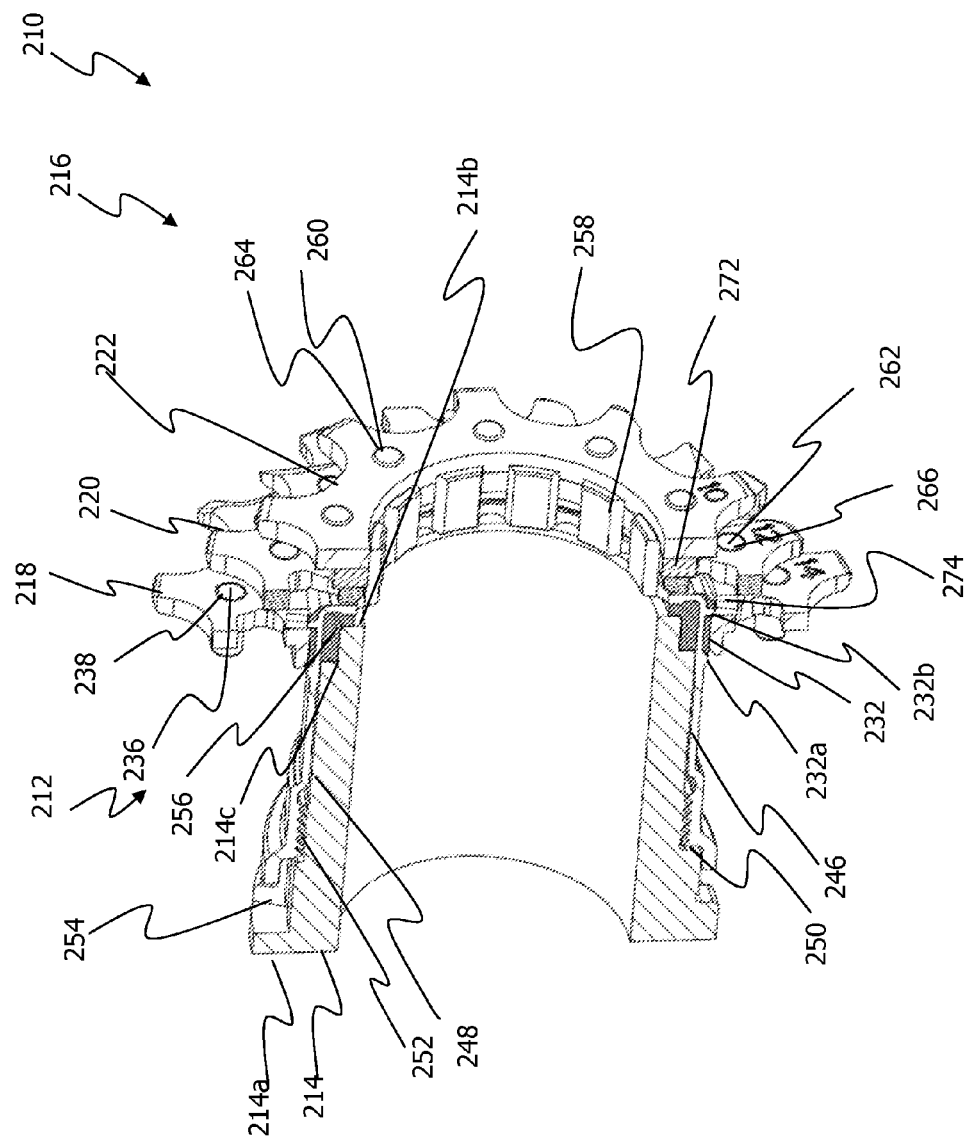
FIG. 16 is a perspective view of a multiple-sprocket arrangement according to the third embodiment of the invention.
Figure 17:
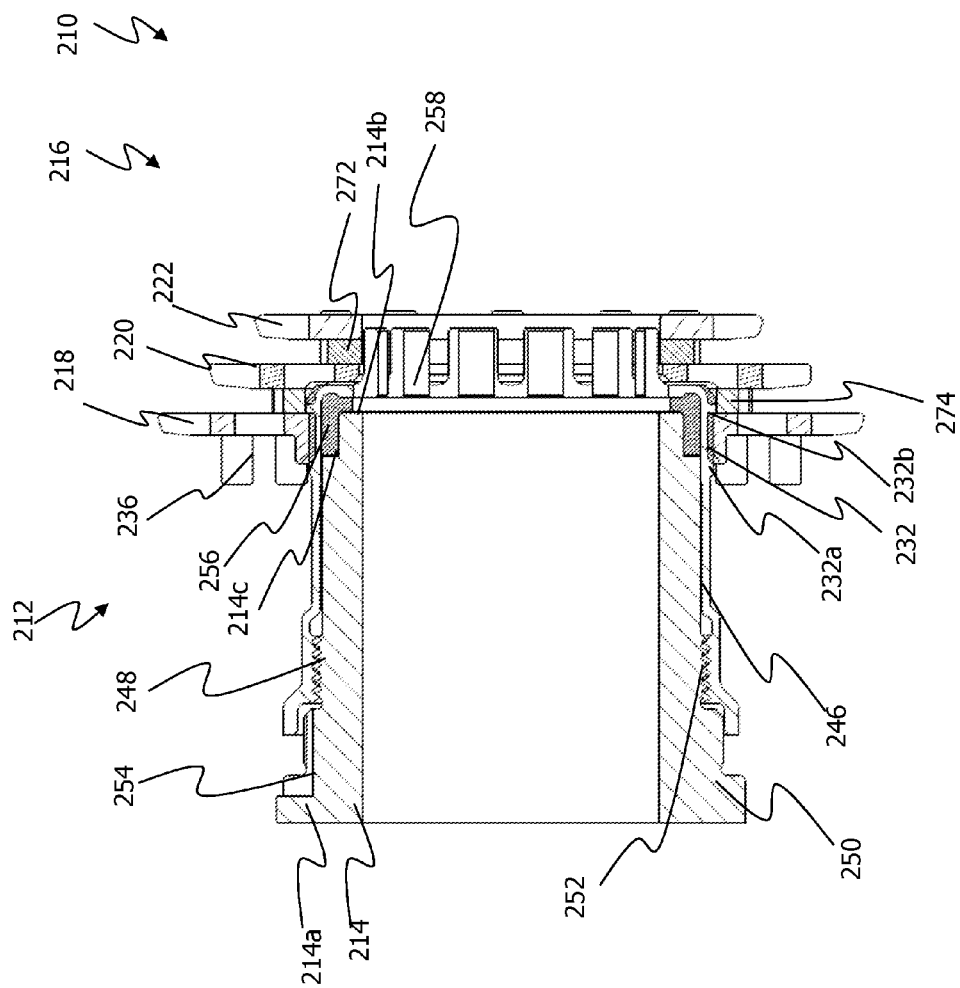
FIG. 17 is a cutaway view of the multiple-sprocket arrangement according to the third embodiment of the invention.

FIGS. 16 and 17 show perspective views of the multiple-sprocket arrangement 210 with the sprocket assembly 216.

The only difference to the previously described second embodiment are the spacer rings 272 and 274 which are provided between the sprockets 218, 220, and 222 of the sprocket assembly 216 and thus provide an axial distance between the sprockets 218, 220, and 222. The spacer 272 adjusts a predetermined axial distance between the sprocket 218 and the sprocket 220. The spacer 274 determines the axial distance between the sprocket 220 and the sprocket 222.

Figure 18:
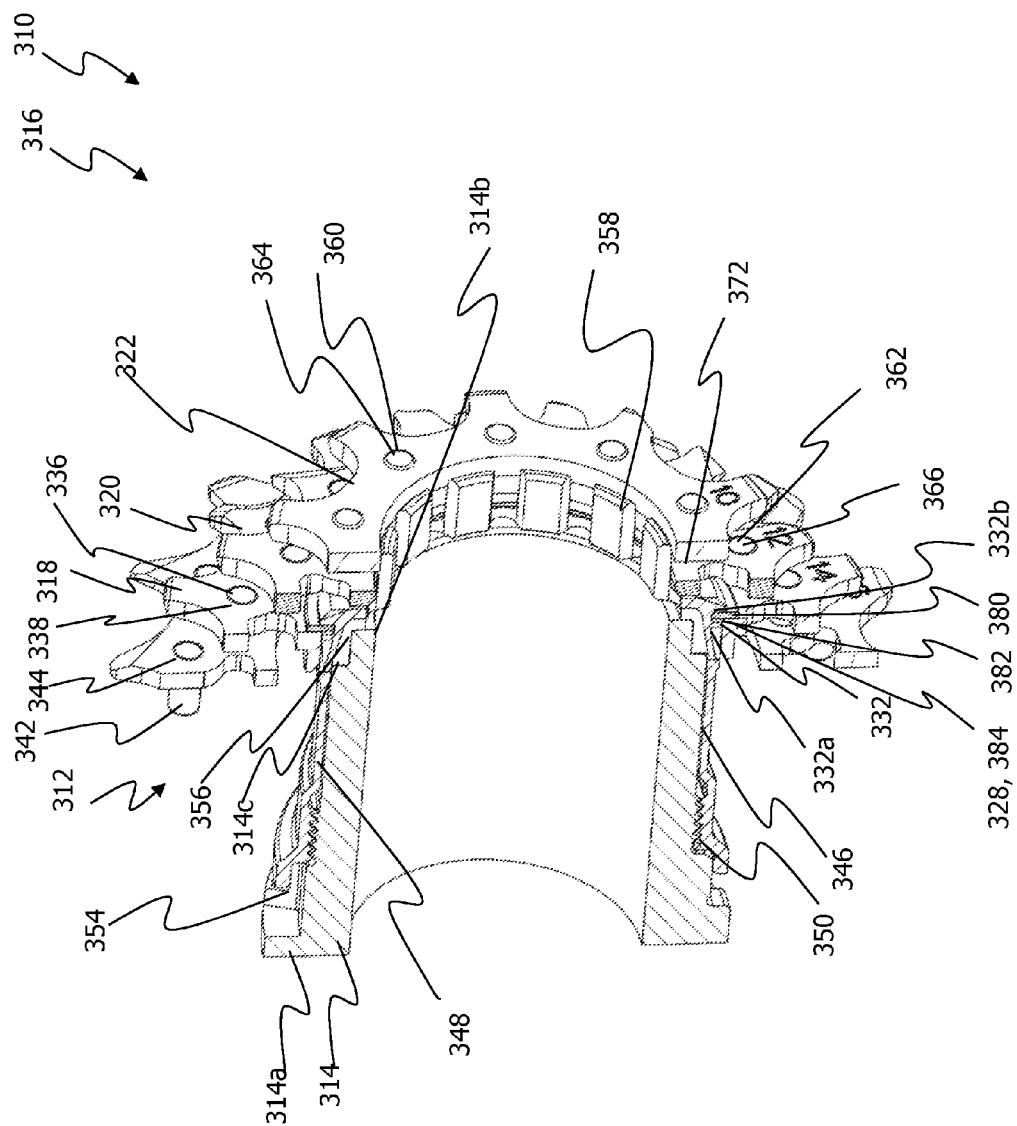
FIG. 18 is a perspective view of a multiple-sprocket arrangement according to a fourth embodiment of the invention.

FIG. 18 shows a perspective view of a multiple-sprocket arrangement 310 according to a fourth embodiment of the invention.

The sprocket assembly 316 corresponds to the sprocket assembly 116 according to the second embodiment.

According to this embodiment, the sprocket assembly 316 is held in axial direction on the receiving body 312 by means of a retaining ring 380. A retaining groove 332 with retaining collars 332a and 332b receives the retaining ring 380 which bears against the flange section 328 of the first sprocket 318 with its axial surface 380a. In other words, the axial surface 382 of the retaining ring 380 is in contact with an axial surface 384 of the flange section 328 or the sprocket 318.

The retaining collar 332a radially supports the sprocket 318 or the sprocket assembly 316. The sprocket 318 bears against the retaining collar 332a with its protrusion 318. The elastomer body 356 is provided on the receiving body 312 and axially and radially positions the receiving body.

Figure 19:
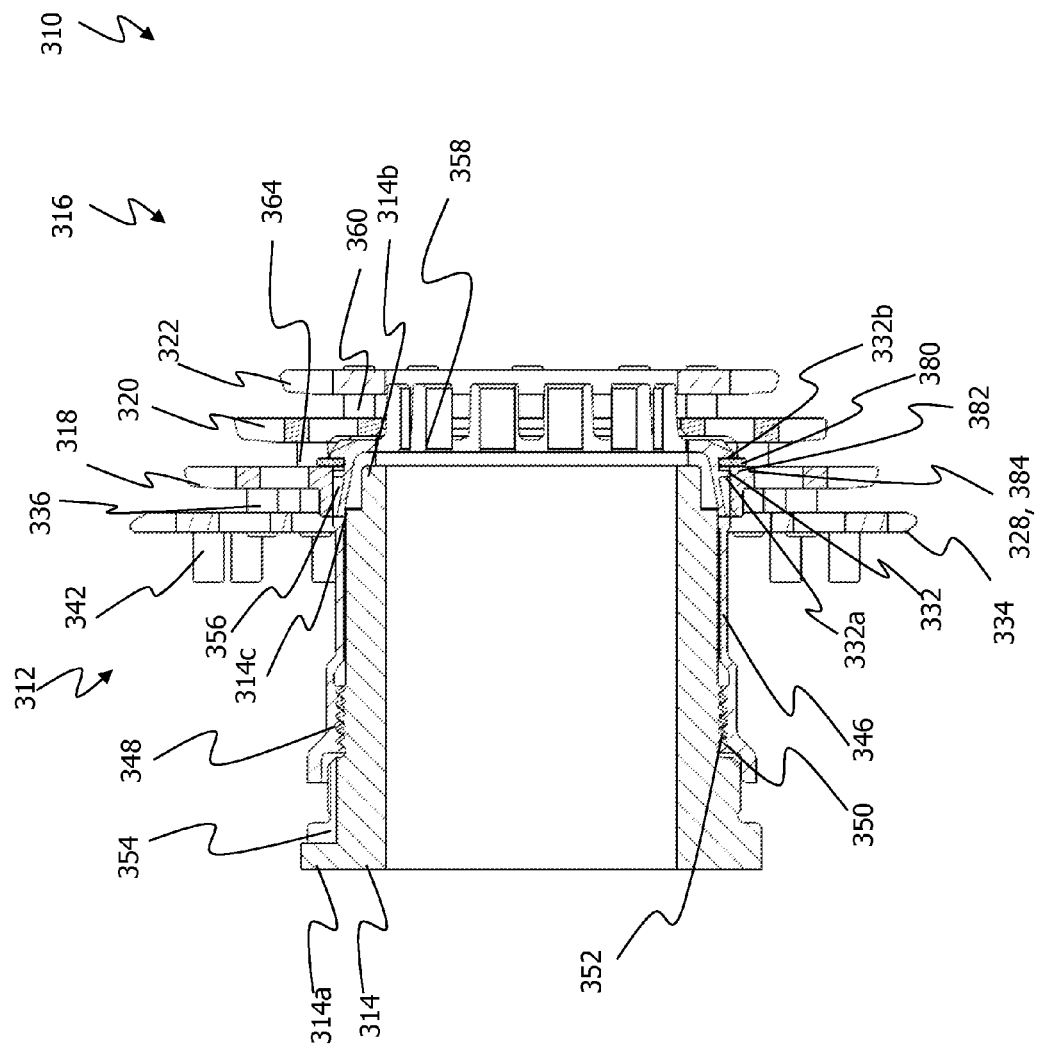
FIG. 19 is a cutaway view of the multiple-sprocket arrangement according to the fourth embodiment of the invention.

FIG. 19 shows a cutaway view of the multiple-sprocket arrangement 310.

The retaining groove 332 receives the retaining ring 380 which is held on the receiving body 312 by means of the retaining collars 332a and 332b. With its axial surface 382, the retaining ring 380 bears against the axial surface 384 of the sprocket 318. The retaining collar 332a radially supports the sprocket 318 or the sprocket assembly 316.

Figure 20:
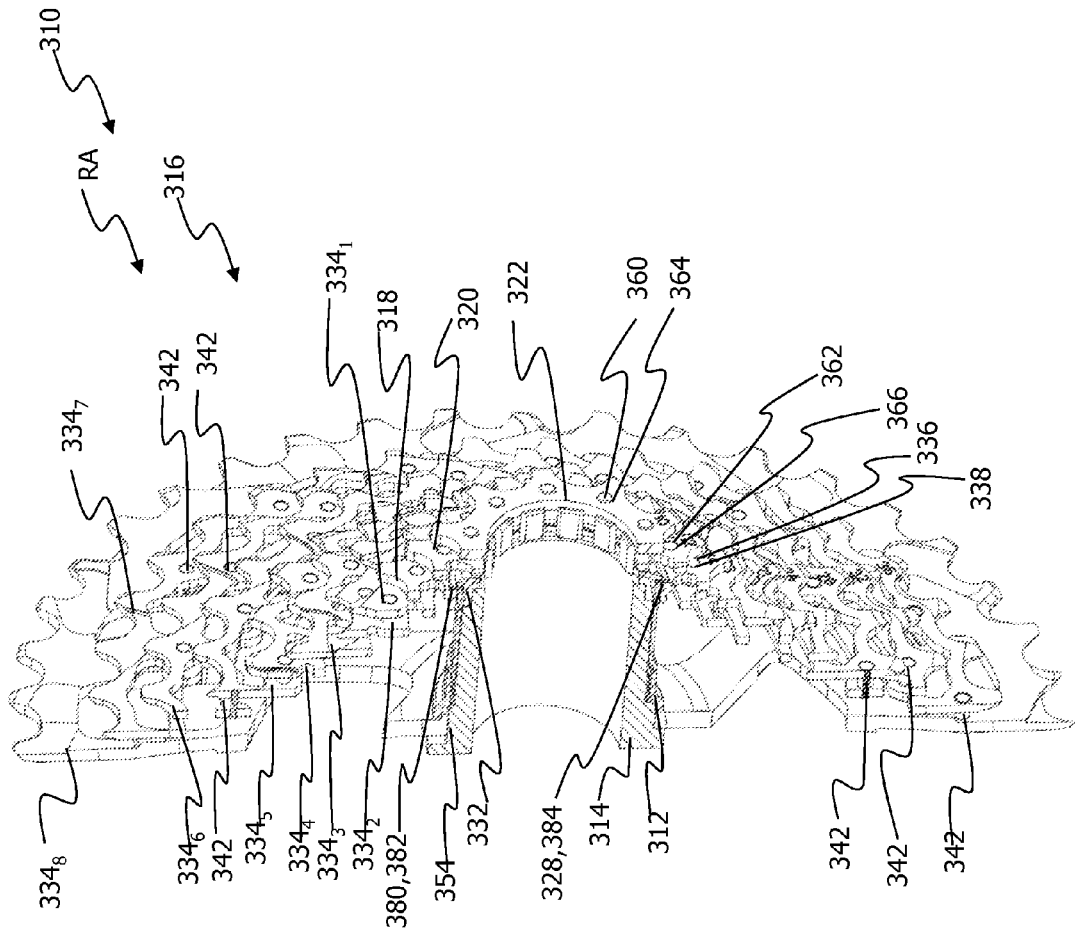
FIG. 20 is a further perspective view of the multiple-sprocket arrangement according to the fourth embodiment of the invention.
Figure 21:
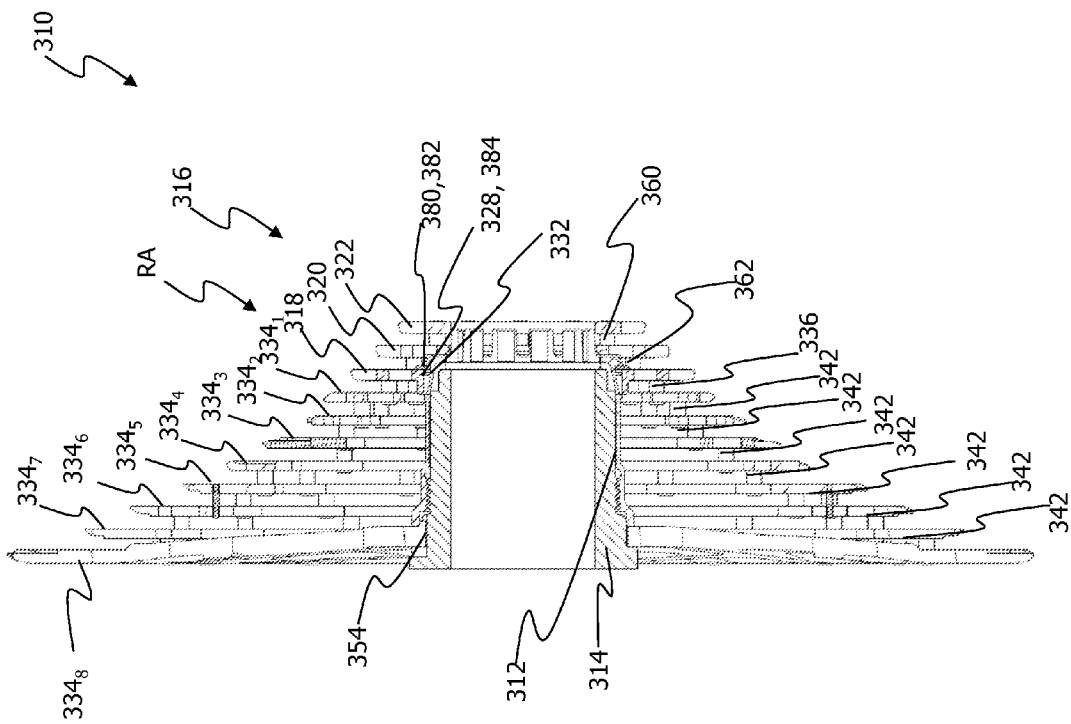
FIG. 21 is a cutaway view of the multiple-sprocket arrangement according to the fourth embodiment of the invention.

FIGS. 20 and 21 show views of the multiple-sprocket arrangement 310 with the sprocket arrangements 358. The sprocket assembly 316 is part of the sprocket arrangement RA. Similar to the previously described embodiments, the torque between the sprocket arrangement RA and the hub sleeve 314 is transmitted by means of the sprocket $334_8$. FIGS. 20 and 21 show the retaining ring 380 which secures the sprocket arrangement 358 on the receiving body 312 in axial direction.

FIGS. 22 and 23 show a sprocket assembly 416 according to a fifth embodiment of the invention.

The sprocket assembly 416 most closely corresponds to the sprocket assembly 16 which was described in conjunction with FIGS. 1 to 7. The sprockets 418 and 420 are connected to one another by means of the flange section 424. The sprockets 420 and 422 are connected to one another by means of a further flange section 426. A flange section 428 is provided on the sprocket 418, wherein, according to this embodiment, no protrusion is provided on the flange section 428. Instead, this embodiment has a snap-in protrusion 486 on the flange section 426. The snap-in protrusion 486 extends radially inward in the form of a prong.

Figure 24:
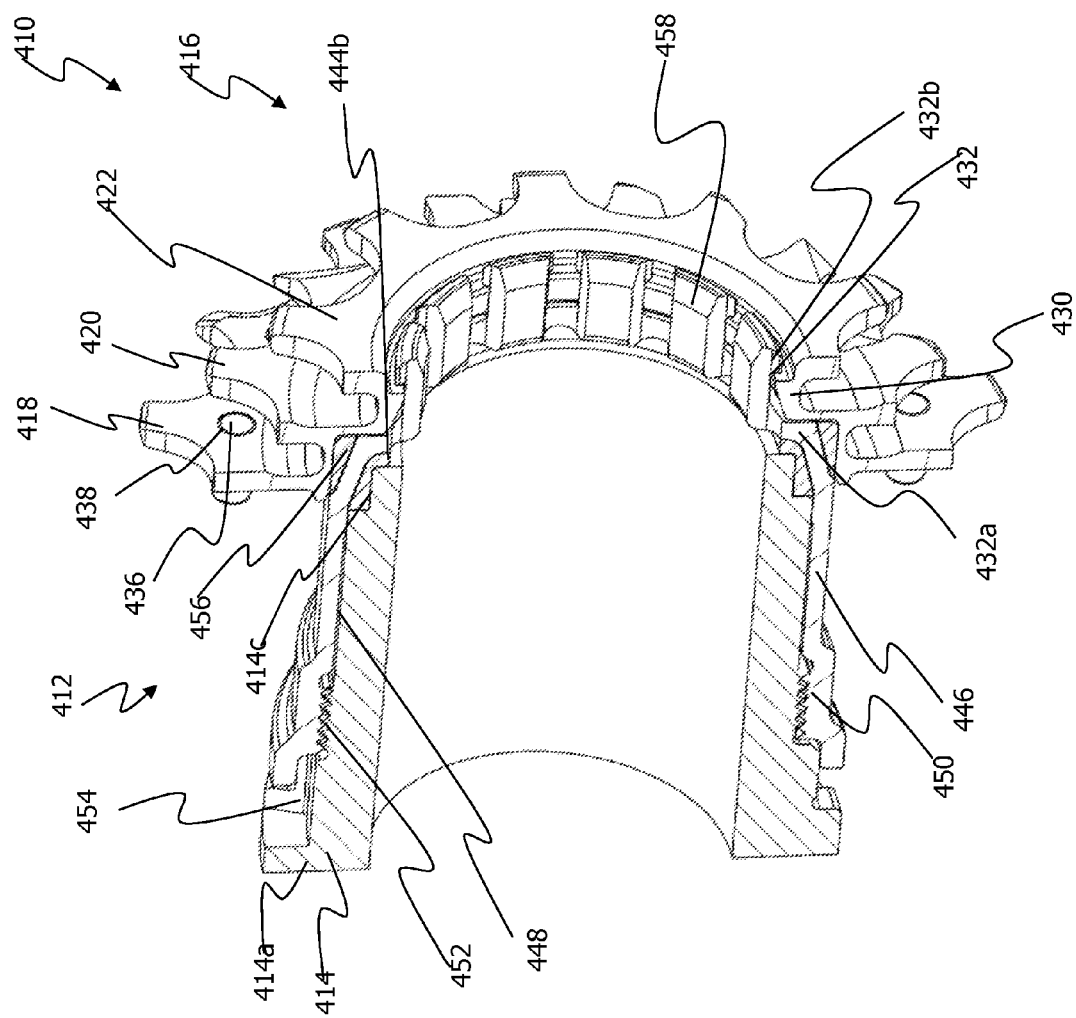
FIG. 24 is a perspective view of a multiple-sprocket arrangement according to the fifth embodiment of the invention.

FIG. 24 shows a perspective view of the multiple-sprocket arrangement 410 with the sprocket assembly 416. In the region of its guide protrusions, the receiving body 412 is provided with a locking groove 432. The locking groove 432 is delimited by a snap-in nose 432a and a support section 432b. The locking groove 432 receives the snap-in protrusion 486 on the flange section 426 and axially secures the sprocket assembly 416 on the receiving body 412. The first sprocket 418 is connected to the receiving body 412 by means of the elastomer body 456.

The locking groove 432 is arranged in front of the axial front side 414b of the hub sleeve 414, i.e. in an unsupported manner in front of the hub sleeve 414b.

Figure 25:
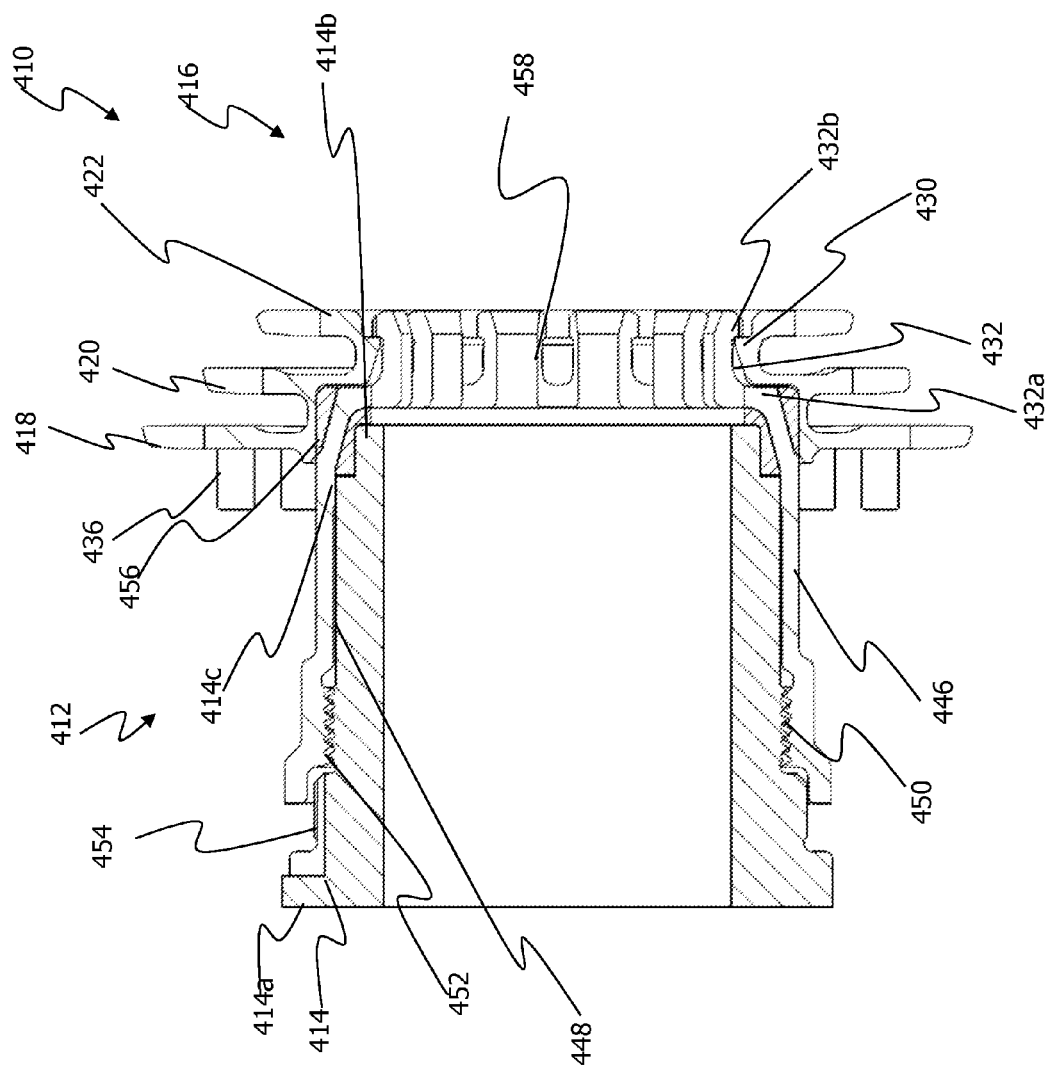
FIG. 25 is a side view of the multiple-sprocket arrangement according to the fifth embodiment of the invention.

FIG. 25 shows a cutaway view of the multiple-sprocket arrangement 410 according to the fifth embodiment of the invention.

The sprocket arrangement 416 is connected to the receiving body 412 by means of the elastomer body 456 on the receiving body 412. The first sprocket 418 is connected to the receiving body 412 by means of the elastomer body 456. The sprocket assembly 416 is secured on the receiving body 412 by means of the snap-in protrusion 430 on the flange section 426 which meshes with the locking groove 432.

Figure 26:
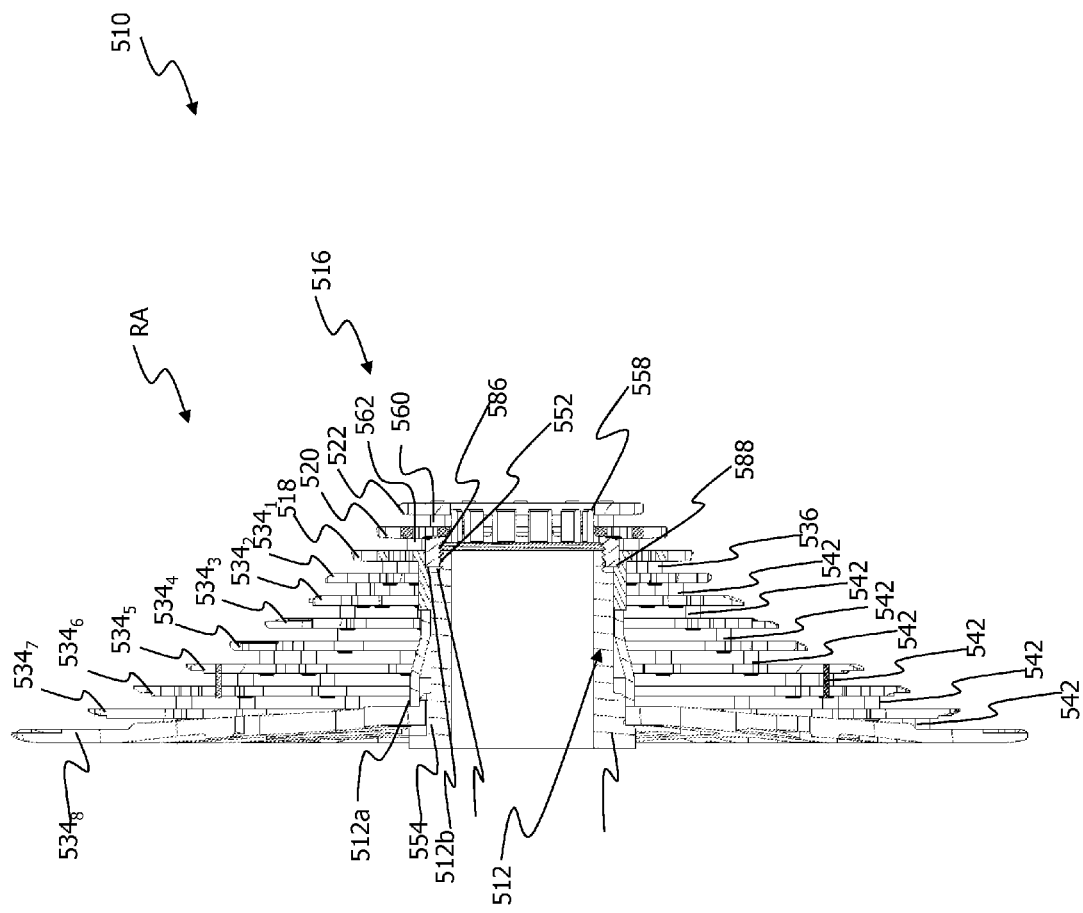
FIG. 26 is a cutaway view of a multiple-sprocket arrangement according to a sixth embodiment of the invention.

FIG. 26 shows a cutaway view of a multiple-sprocket arrangement 510 according to a sixth embodiment.

The sprocket assembly 516 according to this embodiment is, once again, formed by the sprockets 518, 520, and 522 which are connected to one another using the bolts 560 and 562.

According to this embodiment, the receiving body 512 has a multi-piece design and radially supports the sprocket arrangement 558. The receiving body 512 is formed by a first section 512*a* and a second section 512*b*. The second section 512*b* is designed so as to be one piece with the sprocket 518 of the sprocket assembly 516. The sprocket assembly 516 is thus connected to the receiving body 512 by means of the first sprocket 518. A section 552 with a male thread is provided on the hub sleeve 514. A retaining element 586 comprises a female thread and can be screwed to the male threaded section 552. The receiving body 512 or the section 512*a* of the receiving body has a support shoulder 588 for the retaining element 586. The receiving body 512 can be axially tensioned with the sprocket 534$_8$ by means of the retaining element 586 and thus be secured on the hub sleeve 514. The sprocket arrangement RA with the sprocket assembly 516 can be fastened to the hub sleeve 514 by means of the retaining element 586.

The individual sprockets 518, 520, 522, 534$_1$ to 534$_8$ are connected to one another using the bolts 536, 542, 560, and 562.

The section 512*a* of the receiving body 512 extends, in sections, conically in the direction of the sprocket 534$_8$. The sprocket 534$_8$ transmits torque between the sprocket arrangement RA and the hub shell 514. For such purpose, the sprocket 534$_8$ has teeth corresponding to the external teeth 554 on the hub shell 514.

The embodiment according to FIG. 26 is characterized in that the external teeth 554, a radial support point and a section 552 with a male thread are arranged in sequence in axial direction on the hub sleeve 514.

The invention claimed is:

1. A multiple-sprocket arrangement for mounting on a rear wheel axle of a bicycle, comprising:
    a receiving body shaped and sized to mount on the rear wheel axle, and
    a sprocket assembly including a first sprocket connected to the receiving body, the first sprocket having an inner diameter greater than an outer diameter of the receiving body, and at least one second sprocket having an inner diameter smaller than the outer diameter of the receiving body and which is indirectly supported on the receiving body by a connection with the first sprocket, the first sprocket and the at least one second sprocket are connected to one another by separate fasteners.

2. A multiple-sprocket arrangement according to claim 1, wherein the sprocket assembly includes two second sprockets.

3. A multiple-sprocket arrangement according to claim 2, wherein the two second sprockets are connected to one another by a second flange section extending parallel to the rear wheel axle or separate fasteners.

4. A multiple-sprocket arrangement according to claim 1, wherein spacers are provided between adjacent sprockets of the sprocket assembly.

5. A multiple-sprocket arrangement according to claim 2, wherein the two second sprockets have substantially identical inner diameters.

6. A multiple-sprocket arrangement according to claim 1, wherein the first sprocket is provided with a snap-in protrusion in the region of its inner circumference which engages with a locking groove provided in a region of an outer circumference of the receiving body.

7. A multiple-sprocket arrangement according to claim 1, wherein the first sprocket is connected to the receiving body by a retaining element disposed on the receiving body.

8. A multiple-sprocket arrangement according to claim 1, wherein the receiving body is connected to the first sprocket.

9. A multiple-sprocket arrangement according to claim 1, wherein at least one further sprocket is connected to the sprocket assembly in a torque-transmitting manner with a first retaining bolt extending substantially parallel to the rear wheel axle.

10. A multiple-sprocket arrangement according to claim 1, wherein the separate fasteners are pins extending substantially parallel to the rear wheel axle.

11. A multiple-sprocket arrangement according to claim 10, wherein the pins are arranged radially in a region within a tooth tip of the next smallest sprocket.

12. A multiple-sprocket arrangement according claim 8, wherein fasteners extending parallel to the rear wheel axle engage in receiving bores provided in the corresponding sprockets.

13. A multiple-sprocket arrangement according to claim 1, wherein the multiple-sprocket arrangement is configured to operate in combination with a rear wheel axle arrangement for a bicycle, the rear wheel axle arrangement comprising:
    a rear wheel axle designed for mounting on a bicycle frame;
    a hub sleeve rotatably mounted on the rear wheel axle; and
    a torque transmission arrangement to direction-selectively transmit a torque from the multiple-sprocket arrangement to the hub sleeve.

* * * * *